(12) United States Patent
Mariano

(10) Patent No.: US 10,550,554 B2
(45) Date of Patent: Feb. 4, 2020

(54) ELECTRONIC WATER DISTRIBUTION CENTER

(71) Applicant: Michael Antonio Mariano, Rialto, CA (US)

(72) Inventor: Michael Antonio Mariano, Rialto, CA (US)

(*) Notice: Subject to any disclaimer, the term of this patent is extended or adjusted under 35 U.S.C. 154(b) by 84 days.

(21) Appl. No.: 15/729,648

(22) Filed: Oct. 10, 2017

(65) Prior Publication Data
US 2019/0106867 A1 Apr. 11, 2019

(51) Int. Cl.
*E03C 1/05* (2006.01)
*G05D 23/13* (2006.01)
(Continued)

(52) U.S. Cl.
CPC ............ *E03C 1/057* (2013.01); *F16K 19/006* (2013.01); *F16K 31/06* (2013.01); *G05D 23/1306* (2013.01); *E03C 2001/0418* (2013.01)

(58) Field of Classification Search
CPC ........ E03C 1/057; F16K 19/006; F16K 31/06; G05D 23/1306
(Continued)

(56) References Cited

U.S. PATENT DOCUMENTS 4,429,422 A * 2/1984 Wareham .............. F16K 19/00
137/114
4,563,780 A * 1/1986 Pollack ...................... E03B 7/04
137/392

(Continued)

FOREIGN PATENT DOCUMENTS

GB 2172413 * 9/1986

*Primary Examiner* — Albert K Wong

(57) ABSTRACT

Apparatus is provided to electronically operate the hot water and/or cold water supply lines connected to any manual faucet, which can be utilized for any home or business's kitchen and/or bathroom. The electronic water distribution center is a universal device that can connect to any faucet system or water spout to control the water temperature and pressure electronically, hence still allow the users preferred faucet's hot and cold manual controls to move the temperature and pressure up or down manually for the water which is outputted from the spout. The said apparatus has one or two main units in total, which is a central control system and/or a main mcu system. The wired central control system, which can be the entire apparatus, transmits a wired signal to actuate one or more electronic water valves or the wireless central controller or a mobile device send a wireless signal, by way of (Bluetooth, WIFI, ZIGBEE, or any radio controlled signal), to the main mcu system, which in this instance the central controller and the main mcu unit is a two piece apparatus, to actuate one or more electronic water valve. One electronic water valve controls the hot water and the second electronic water valve control the cold water. Both electronic water valves used in unison creates a precise warm water temperature. The said apparatus can electronically control the pressure output for any home or business's kitchen and/or bathroom, faucet electronically by pressing the hot, cold, or warm temperature switch push buttons up or down or can output water from the apparatus, via a touch-less and/or wireless means, by utilizing the central controller systems on-board motion sensor and/or the external stand-alone motion sensor circuit.

6 Claims, 13 Drawing Sheets

(51) Int. Cl.
*F16K 31/06* (2006.01)
*F16K 11/00* (2006.01)
*E03C 1/04* (2006.01)

(58) Field of Classification Search
USPC .......................................... 340/606; 700/282
See application file for complete search history.

(56) References Cited

U.S. PATENT DOCUMENTS

| | | | | |
|---|---|---|---|---|
| 4,756,030 | A * | 7/1988 | Juliver | E03C 1/055 |
| | | | | 137/334 |
| 6,305,663 | B1 * | 10/2001 | Miller | E03C 1/052 |
| | | | | 251/129.04 |
| 8,162,236 | B2 * | 4/2012 | Rodenbeck | E03C 1/057 |
| | | | | 239/390 |
| 2007/0246550 | A1 * | 10/2007 | Rodenbeck | E03C 1/057 |
| | | | | 236/12.11 |
| 2011/0185493 | A1 * | 8/2011 | Chen | E03C 1/057 |
| | | | | 4/623 |
| 2012/0017367 | A1 * | 1/2012 | Reeder | E03C 1/055 |
| | | | | 4/597 |
| 2017/0218606 | A1 * | 8/2017 | Wang | E03C 1/057 |
| 2017/0260722 | A1 * | 9/2017 | Horwitz | G01F 15/06 |

* cited by examiner

ELECTRONIC WATER DISTRIBUTION CENTER

CROSS-REFERENCE TO RELATED APPLICATION

This application is a continuation of U.S. patent application No. 62/405,907, filed Oct. 8, 2016.

BACKGROUND OF THE INVENTION

Today, we as humans are constantly innovating new ways to make our lives easier while also focusing on sustainable development. The key to excellent water distribution is to distribute water with ease, quickly, to select any temperature and/or pressure, efficiently and mostly to distribute water precisely without wasting water. Those are the key functions of the "Electronic Water Distribution Center". The "Electronic Water Distribution Center (EWDC)" is not an electronic faucet; the said apparatus is a universal system that can turn any manual faucet known to man into a faucet that is operated electronically. The said apparatus is constructed with a central controller module (either wired or wireless (ex: wireless controller, mobile device, Bluetooth, WIFI, Radio controller), and/or main MCU system, which both units alone, will be constructed to control one or more electronic water valves. The "Electronic Water distribution center" is an electronic device with many functionalities. The said apparatus can output water by pressing one of the Temperature switch push buttons up and/or down, or with the option of an on-board motion sensor and/or an external motion sensor. The said apparatus also saves repetitiously used water depth levels for anytime access (ex: washing dishes or bathing). The user can auto-fill saved water depth with automatic cut-off. The Electronic Water Distribution Center also has a measurement system to output, but not to be limited to, 1-5 cups of water by way of the on-board motion sensor, the external motion sensor, or mobile device application. The "Electronic Water Distribution Center" is the answer for anybody who want to have the faucet of their choice and make it operate electronically. The said apparatus is universal, which means, it can hook up to any faucet the user has in mind, or the user can use the faucet he/she already have at their home/business and have the system up and running in ten minutes, hence make it operate electronically without the need for a plumber. The "Electronic Water Distribution Center" even hook up to and electronic faucet. These features allow the user to have more control of how you want your kitchen or bathroom sink/tub faucet to look as opposed to a generic electronic faucet that is restricted to one simple faucet design that has only one function. If the user has a solid gold faucet and want it to operate wireless and electronically, the "Electronic Water Distribution Center" is all you need.

BRIEF SUMMARY OF VARIOUS EMBODIMENTS OF THE INVENTION

Various embodiment's of the invention include, but not to be limited to, multiple types of Electronic Water Distribution Center central Controller(s), a main MCU device, and several electronic water valves. The types of central controllers the Electronic Water Distribution Center consist of is either wired controlled, wireless controlled, or mobile phone controlled. The wired controlled version of the Electronic Water Distribution Center has an external motion controller device and/or on-board motion controller, hot, cold, and warm temperature push button central controller, an electronic overflow circuit, a depth saving function to save repetitiously used water depth for any time use, and also have full access to all controls on your mobile device, tablet, or computer by means of Bluetooth and/or WIFI. The wireless controlled version of the Electronic Water Distribution Center has a temperature push button central controller that has a microcontroller, Bluetooth/WIFI connectivity, and a motion sensor that is on-board the temperature push button controller. The temperature push button controller consists of hot, cold, and warm water temperature switch buttons, an electronic overflow circuit, a water depth level saving function to save repetitiously used water depth for any time use, and also have full access to all controls of the Electronic Water Distribution Center via your mobile device, tablet, or computer by means of Bluetooth and/or WIFI. The said apparatus also has a vibrator and/or speaker/piezo buzzer to signal the user to let them know that water is on or off, or a mode is entered or exited. The vibrator and/or speaker/piezo buzzer is used to produce a signal back to the user every time a button is pressed. The Difference between the two controllers is that the wired version has Cables and the wireless module has no cables. The main MCU module in both wired and wireless units consist of a microcontroller, a driver circuit, and a Bluetooth and/or WIFI module(s) circuit. Lastly, Electronic Water valves are used to control the water output, hence to actuate the water flow Electronically. The users faucet is already equipped with one or more manual shut/off valves to revert your faucet back to full manual operations.

BRIEF DESCRIPTION OF THE DRAWINGS

(FIG. 1C, FIG. 2B, and FIG. 4), hence depicts the apparatus connected to the bathroom sink. This image also depicts how the mobile device send a wireless signal to control the main mcu and also how the wired temperature switch push button with internal and/or external motion sensor central controller and the water level detection circuit(s) send wired output signals to connect to the wired main MCU unit, hence also depicts how the main mcu unit electronically control the plurality of electronic water valves.

DETAILED DESCRIPTION OF VARIOUS EMBODIMENTS

All components utilized in conjunction with the Electronic Water Distribution Center's illustrations in this particular patent are subject to change, and should not be limited to what is depicted, but are utilized to fulfill the policy of this patent. All components whether mechanical or electrical will be re-analyzed and different components may or may not be utilized to assemble the Electronic Water Distribution Center. Any and all new components used will have similarities as the stated used components in conjunction with the Electronic Water Distribution Center.

Figure 1A:
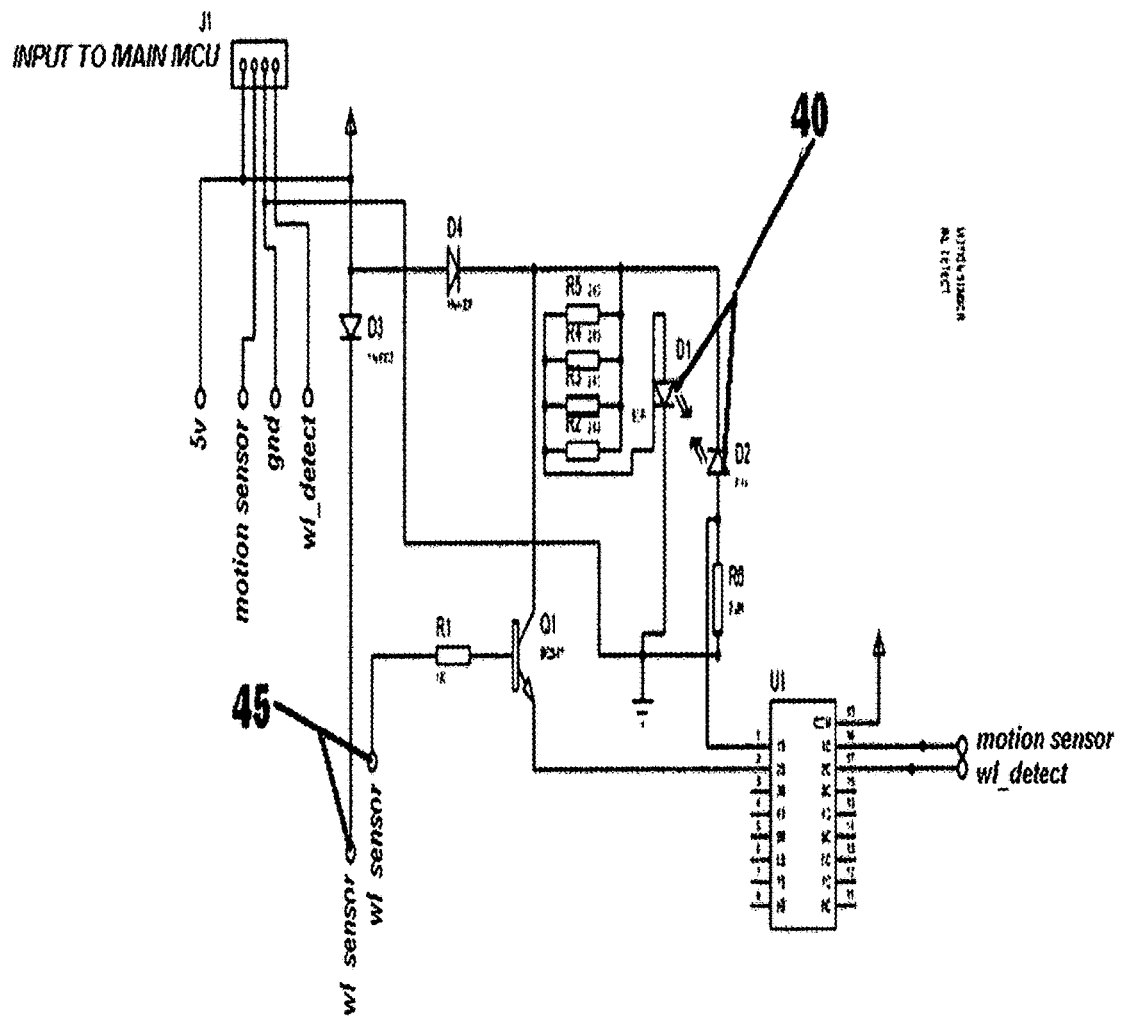
FIG. 1A Illustrates the Electronic Water Distribution Center's wired (version 1) external motion sensor controller and water level detection circuit electronic schematics, hence also depicts the outputs of the motion sensor controller circuit and water level detection circuit, which are all inputted to the main MCU unit, or inputted in the central controller if the main MCU unit and the central controller is embedded together as one single unit.
Figure 1B:
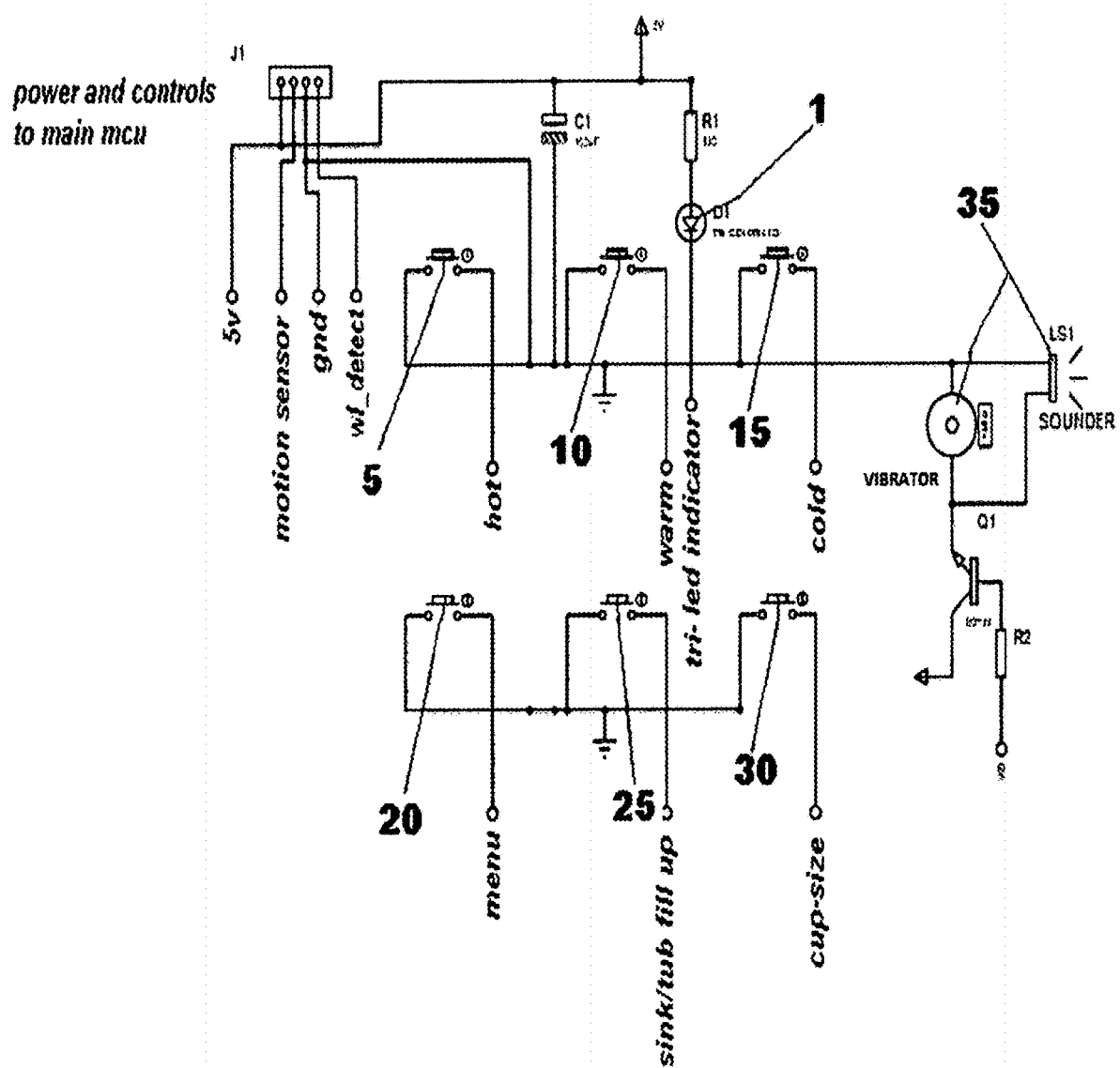
FIG. 1B Illustrates the Electronic Water Distribution Center's wired (version 1) push button central controller's electronic schematics, hence also depicts the outputs of each button, which are all inputted to the main MCU unit, or inputted in the central controller if the main MCU unit and the central controller is embedded together as one single unit.

FIG. 1A Illustrates the Electronic Water Distribution Center's wired (version 1) external motion controller (40) and water over-flow detect (water level detection) (45) circuit electronic schematics. The external motion controller circuit (40) is constructed with and infrared receiver transmitter package; the infrared transmitter and receiver is first connected close together in proximity; the said transmitter emit an infrared beam signal into the atmosphere; if the user wave their hand or object in the range of the infrared transmitter/receiver package circuit, the infrared beam then bounces off of the object and is collected within the receiver to produce an output signal to interrupt the microcontroller (75) on the main MCU unit (FIG. 1C); the motion controller circuit is utilized upon the apparatus to first, output water by way of motion detection from a human or an object; second, is utilized to output the last temperature that was pressed by the temperature switch push button controller (FIG. 1B) to output for anytime use; third, is utilized to output a selected cup size of water ranging from, but not to be limited to, 1-5 cups, which is switched by the cup size button (30) upon the push button central controller (FIG. 1B). The water over-flow detection circuit (45) is configured with a low frequency/fast switching/ultra low current sensing/audio transistor. A small positive input signal is applied through an fast switching 1n4148 diode and the low frequency audio amplifier is utilized to produce the output signal to the main MCU unit's microcontroller. The water over-flow detector (45) is connected to the side of the user sink, as shown later in (FIG. 5 AND FIG. 6), by way of (for example a magnetic enclosure or an enclosure with a sticky double sided adhesive tape). If a body of water reach the height and/or position of where the user placed the said water over-flow detection circuit (45), the water over-flow detection sensor (45) will then output a signal to the input of the microcontroller (75) upon the main MCU unit (FIG. 1C), hence the main mcu unit (FIG. 1C) automatically turn both hot and/or cold water electronic water valves (95) and (100) off until water is under the input of the water over-flow detection (45) circuit. Once the water is under the water over-flow circuit (45) the apparatus can then be operated again.

FIG. 1B Illustrates the Electronic Water Distribution Center's wired (version 1) push button central controller electronic schematics, First, the said apparatus hot button (5), cold button (15), and/or warm button (10) is utilized upon the system for the user to output selected water temperature and pressure from the said apparatus for a prolonged period of time; second, is utilized to select which ever water temperature and pressure the user want the motion sensor circuit (40) to operate on; the tri-led (1) is used to let user know what temperature of water that is coming out of the apparatus and/or what temperature the motion sensor circuit (40) is to operate on. third, the menu button (20) is there to select and change water depth mode; water depth mode allow the user to save a preferred amount of water that is used normally (to wash dishes or/and to get in the tub); sink/tub fill up button (25) is to activate the save water depth and temperature that was selected during the saving procedure by way of the press of a button. The c-size button (30) is the cup size select button. The c-size button (30) is used to select how many cups of water, but not to be limited to, between 1-5 cups of water, that can be selected, hence is outputted by the motion sensor circuit (40) being activated. The vibrator and/or sounder circuit (35) is utilized on the system as an audio or physical indicator. For example: to let the user know that the water is on or off, that a certain mode is selected, or that the water depth level is saved. The vibrator and/or sounder circuit (35), is configured by utilizing a vibrator motor and/or a speaker or piezo buzzer in conjunction with the push button central controller, which are connected as outputs of the microcontroller (75) upon the main mcu unit. The vibrator is utilized in the circuit, as a physical indicator to the user, to vibrate the push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on. The sounder, as depicted is a speaker or piezo buzzer. The sounder will sound a audio sound or tone from the push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on.

Figure 1C:
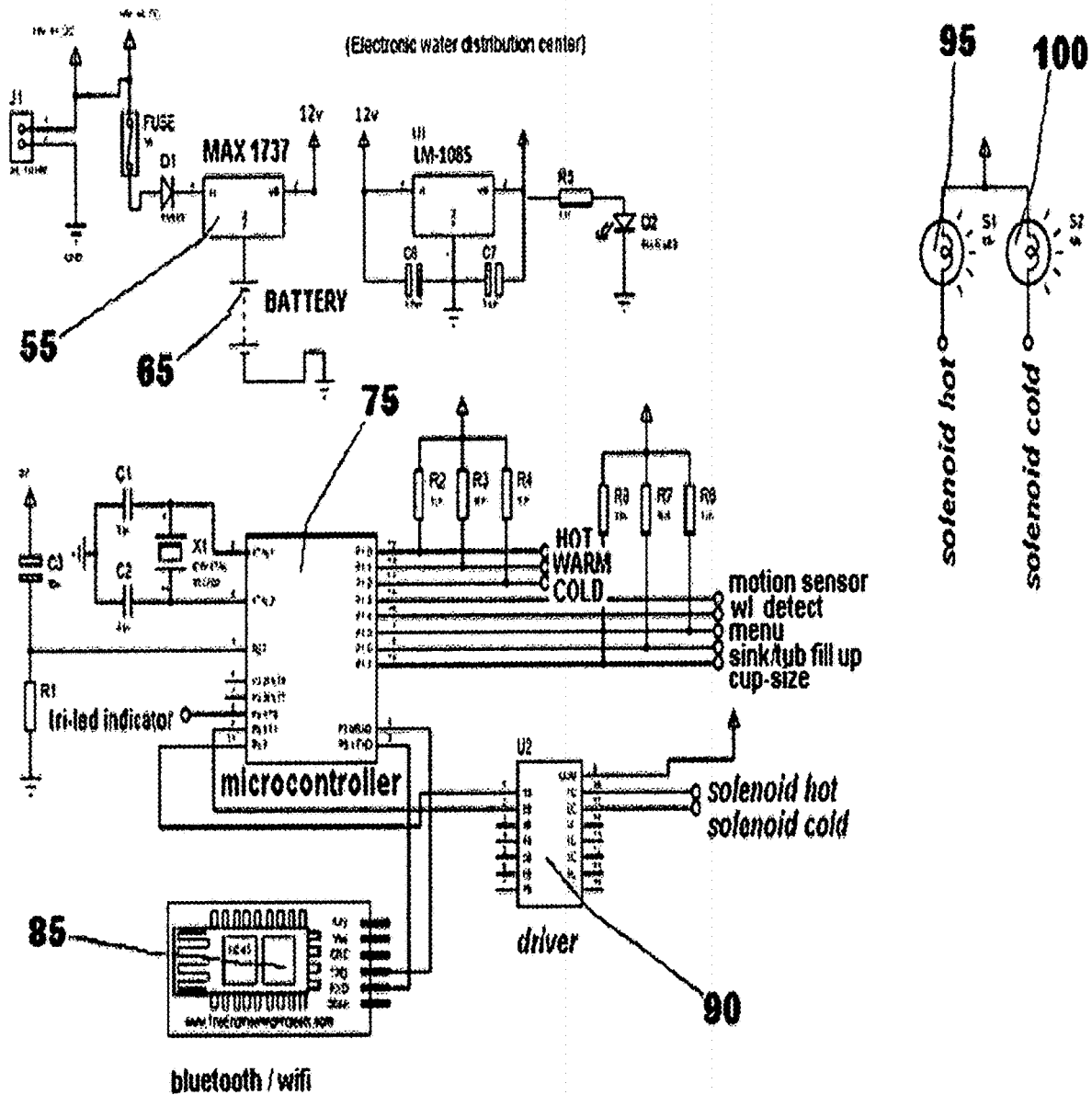
FIG. 1C Illustrates the Electronic Water Distribution Center's wired (version 1) main MCU unit electronic schematics, hence also depicts the inputs coming from each button from the push button central controller, the external motion sensor controller, and the water level detection circuit, which are all inputted to the main MCU unit. Lastly, this illustration depicts how the main MCU unit then output a signal to control the plurality of electronic water valves.

FIG. 1C Illustrates the Electronic Water Distribution Center's wired (version 1) main MCU electronic schematics, which depicts how the external motion controller (FIG. 1A), the water over-flow detection circuit (FIG. 1A), the push button controller (FIG. 1B), and how the Hot and Cold electronic water valves (95) (100) are connected to the main MCU unit. The main MCU unit power supply source is constructed with, but not to be limited to, a maxim 1737 IC, which is a battery charger integrated circuit (55). The maxim 1737 is a lithium ion battery charger circuit (55) that charges the system battery (65) and also provide system power in unison; the system battery (65) is provided for a power outage situation and/or to operate the system by battery power and/or by solar. Once the system battery (65) reach full charge, the system battery (65) no longer is charging or is discharging unless dc wall plug has a power failure. The system microcontroller (75) is used for various functions and purposes. The microcontroller (75) holds the C++ program that accepts the inputs from the external motion controller circuit (40), water over-flow circuit (45), and the push button central controller remote (FIG. 1Bt). The microcontroller (75) then outputs a signal to the driver circuit (90), which is constructed with a Darlington pair, a half h-bridge, or a full h-bridge driver. The said Driver circuit then output an amplified signal to actuate the hot water (95) and/or the cold water (100) electronic water valves that was selected by the user. The said Darlington pair, half h-bridge, and/or a full h-bridge driver can operate, for example: a dc motor, a stepper motor, and/or electronic solenoid. The said driver integrated components above, for example, can also be used to reverse the polarity of a dc motor and/or stepper motor, which also can and will be utilized in conjunction with this apparatus, to make a proportional valve go forward and/or backward or to make a solenoid valve actuate up or down. The microcontroller (75) also mean for the user to save their preferred water depth and output that saved water depth by pressing the sink/tub fill-up button (25) once. The microcontroller means (75) to send and receive data through its full duplex UART/USART system via ZIGBEE/BLUETOOTH/WIFI/Radio Control (85). The Electronic Water Distribution Center has either a ZIGBEE/BLUETOOTH/WIFI/Radio Control (85) communication system for the means of communicating with the system via mobile device (android or apple), or from any computer device via a Bluetooth and/or WIFI device, with a self-contained app. The said ZIGBEE, BLUETOOTH, and/or WIFI Radio Control (85) communication system that are utilized in conjunction with the apparatus, is a self contained module, that obtains an on-board antenna, an on-board radio signal controller, and a on-board microcontroller, which are all used to communicate with the main mcu unit's microcontroller (75). Any device that is utilized to control the apparatus through Bluetooth, WIFI, or ZIGBEE (85) connectivity will have full control of the apparatus and will be able to control all of the apparatus's said functions from that device via the device application.

Figure 1D:
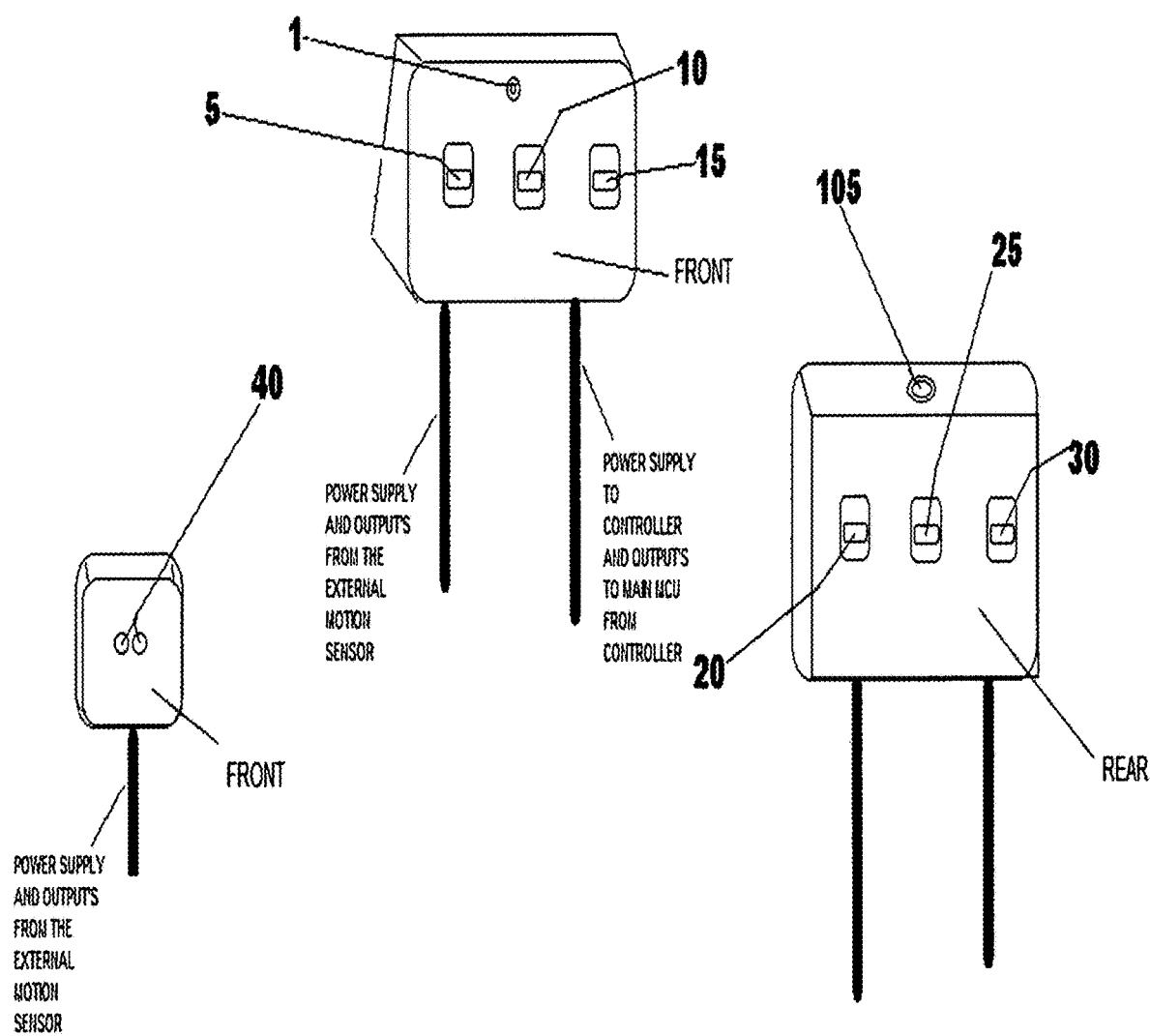
FIG. 1D Illustrates models of the external enclosures for the Electronic Water Distribution Center's wired (version 1) external motion sensor controller and the Electronic Water Distribution Center push button central controller.

FIG. 1D Illustrates models of the external enclosures for the Electronic Water Distribution Center's wired (version 1) external motion sensor controller (FIG. 1A) and the Electronic Water Distribution Center push button central controller (FIG. 1B). The said version was invented for the user to be able to mount the external motion sensor circuit (FIG. 1A), the temperature push button central controller (FIG. 1B), and the main MCU unit (FIG. 4) where ever the user want for their own convenience. For example: The user might want the external motion sensor controller (FIG. 1A) in the back of the sink and the temperature push button controller (FIG. 1B) on the lip of the sink. It was created for the user to have more versatility and convenience with how the system is operated in their own home or business.

Figure 2A:
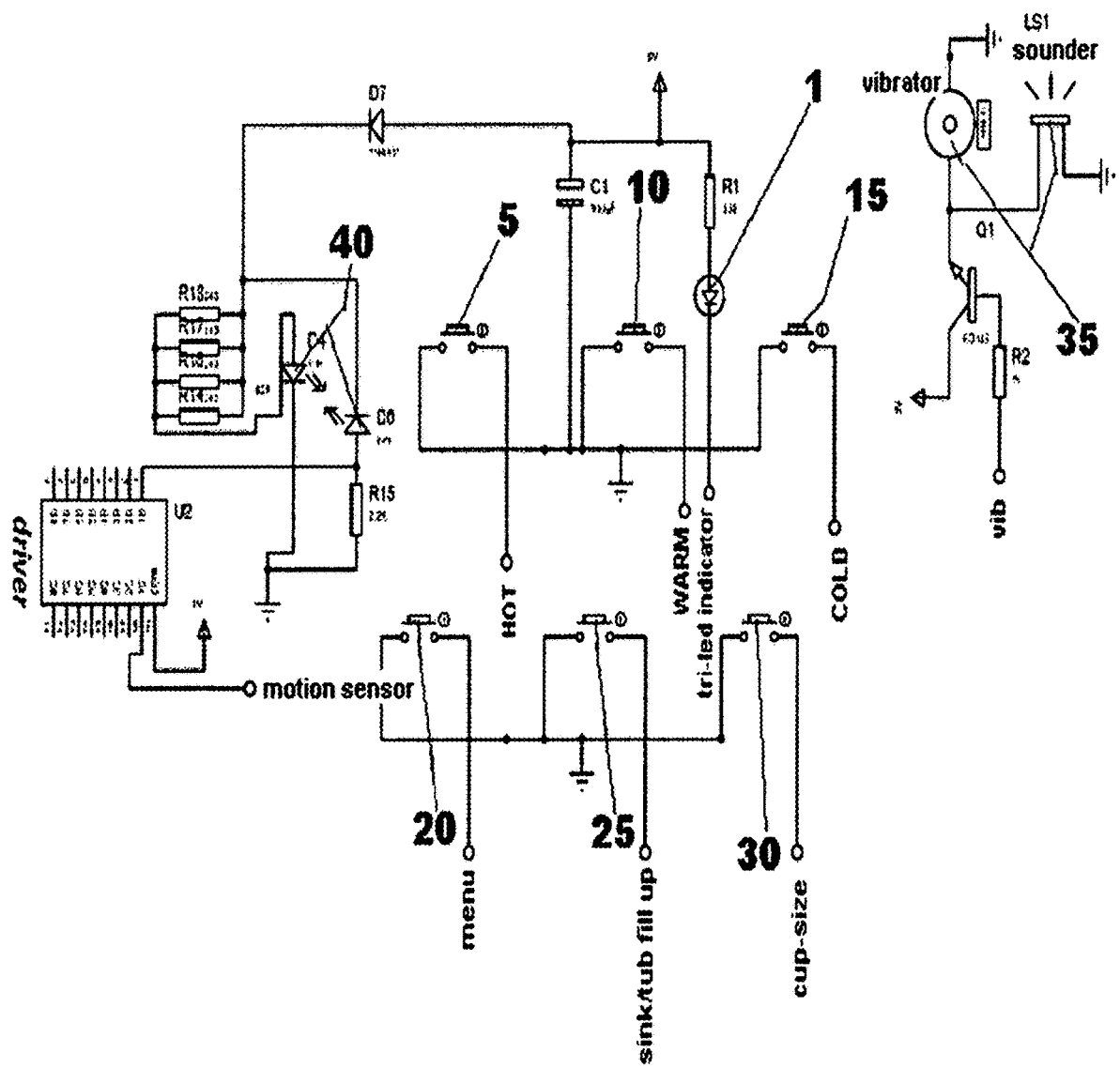
FIG. 2A Illustrates the Electronic Water Distribution Center's wired (version 2) push button controller with embedded motion sensor circuit electronic schematics, hence also depicts the outputs of each button and the outputs for the motion sensor controller, which are all inputted to the main MCU unit, or inputted in the central controller if the main mcu unit and the central controller is embedded together as one single unit.
Figure 2B:
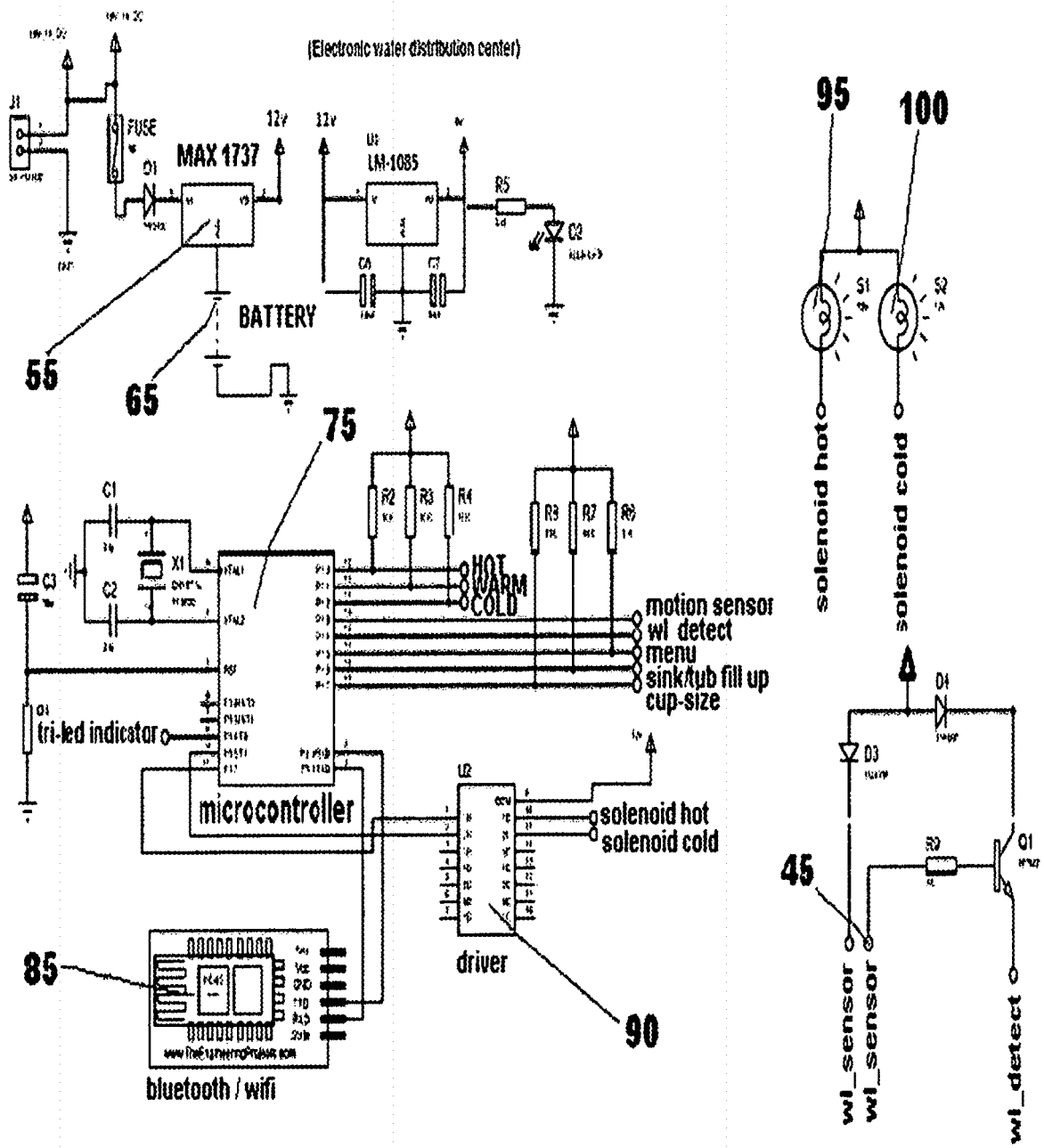
FIG. 2B Illustrates the Electronic Water Distribution Center's wired (version 2) main MCU unit electronic schematics, hence also depicts the inputs coming from, each button(s), motion sensor(s), and water level detection circuit, which are all inputted to the main MCU unit. Lastly, this illustration depicts how the main MCU unit then output a signal to connect to the plurality of electronic water valves.

FIG. 2A Illustrates the Electronic Water Distribution Center's wired (version 2) push button central controller with embedded motion sensor circuit electronic schematics. This specific version of the Electronic Water Distribution Center has the motion sensor circuit (FIG. 1A) and the temperature push-button controller (FIG. 1B) embedded all in one controller. The water over-flow detection circuit (45) is connected upon the (version 2) main MCU unit (FIG. 2B). The motion controller circuit (40) is constructed with and infrared receiver transmitter package; the infrared transmitter and receiver is first connected close together in proximity; the said transmitter emit an infrared beam signal into the atmosphere; if the user wave their hand or object in the range of the infrared transmitter/receiver package circuit, the infrared beam then bounces off of the object and is collected within the receiver to produce an output signal to interrupt the microcontroller (75) on the main MCU unit (FIG. 2B); the motion controller circuit is utilized upon the apparatus to first, output water by way of motion from a human or an object; second, is utilized to output the last temperature and pressure that was pressed upon the temperature switch push button central controls to output for anytime use; third, is utilized to output a selected cup size of water, but not to be limited to, ranging from 1-5 cups, that is switched by the cup size button (30) upon the push button controls. Now concerning the push-button controls; First, the said apparatus hot button (5), cold button (15), and/or warm button (10) is utilized upon the system for the user to output selected water temperature and pressure from the said apparatus for a prolonged period of time; second, is utilized to select which ever water temperature and pressure the user want the motion sensor circuit (40) to operate on; the tri-led (1) is used to let user know what temperature of water that is coming out of the apparatus and/or what temperature the motion sensor circuit (40) is to operate on. Third, the menu button (20) is there to select and change water depth mode. Water depth mode allow the user to save a preferred amount of water that is used normally (to wash dishes or/and to get in the tub); sink/tub fill button (25) is to activate the save water depth and temperature that was selected during the saving procedure by way of the press of a button. The c-size button (30) is the cup size select button. The c-size button (30) is used to select how many cups of water, but not to be limited to, between 1-5 cups of water can be selected, that is outputted by the motion sensor circuit (40). The vibrator and/or sounder circuit (35) is utilized on the system as an audio or physical indicator. For example: to let the user know that the water is on or off, that a certain mode is selected, or that the water depth level is saved. The vibrator and/or sounder circuit (35), is configured by utilizing a vibrator motor and/or a speaker or piezo buzzer in conjunction with the push button central controller, which are connected as outputs of the microcontroller (75) upon the main mcu unit. The vibrator is utilized in the circuit, as a physical indicator to the user, to vibrate the push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on. The sounder, as depicted is a speaker or piezo buzzer. The sounder will sound a audio sound/tone from the push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on.

FIG. 2B Illustrates the Electronic Water Distribution Center's wired (version 2) main MCU unit electronic schematics, which depicts how the push button with embedded motion sensor central controller and the water over-flow detect circuit (45) is connected to the main MCU unit. The main MCU unit power supply source is constructed with, but not to be limited to, a maxim 1737 IC, which is a battery charger integrated circuit (55). The maxim 1737 is a lithium ion battery charger circuit (55) that charges the system battery and also provide system power in unison; the system battery (65) is provided for a power outage situation and/or to operate the system by battery power and/or by solar. Once the system battery (65) reach full charge, the system battery (65) no longer is charging or is discharging unless dc wall jack plug has a power failure. The system microcontroller (75) is used for various functions and purposes. The microcontroller (75) holds the C++ program that accepts the input signals from the motion controller circuit (40), the water over-flow circuit (45), and the temperature push-button with embedded motion sensor central controller remote (FIG. 1B), hence the microcontroller (75) will then outputs a signal to the selected driver circuit (90), which then output a signal to the hot water (95) and/or the cold water (100) electronic water valves to output the water temperature and pressure that was selected by the user. The said Darlington pair, half h-bridge, and/or a full h-bridge driver can operate, for example: a dc motor, a stepper motor, and/or electronic solenoid. The said driver integrated components above, for example, can also be used to reverse the polarity of a dc motor and/or stepper motor, which can and will be utilized in conjunction with this apparatus, to make a electronic proportional valve go forward and/or backward or to actuate a electronic solenoid valve up or down, The microcontroller (75) also mean for the user to save their preferred water depth and output that saved water depth by pressing the sink/tub fill button (25) once; microcontroller means (75) to send and receive data through its full duplex UART/USART system via ZIGBEE/BLUETOOTH/WIFI/Radio Control (85). The Electronic Water Distribution Center has either a ZIGBEE/BLUETOOTH/WIFI/Radio Control (85) communication system for the means of communicating with the system via mobile device (android or apple), or from any computer device via a Bluetooth or WIFI device self-contained app; any device that is utilized to control the apparatus through ZIGBEE, Bluetooth, or WIFI (85) connectivity will have full control of the apparatus and will be able to control all of the apparatus's said functions from that device via the device application. The said ZIGBEE, BLUETOOTH, and/or WIFI Radio Control (85) communication system that are utilized in conjunction with the apparatus, is a commercially sold self contained module, that obtains an on-board antenna, an on-board radio signal controller, and a on-board microcontroller, which are all used to communicate with the main mcu unit's microcontroller (75). The water over-flow detection circuit (45) is configured with a low frequency/fast switching/ultra-low current sensing/audio transistor. A small positive input signal is applied through an fast switching 1n4148 diode and the low frequency audio amplifier is utilized to produce the output signal to the microcontroller; The water over-flow detector (45) is connected to the side of the user sinks, as shown later in (FIG. 5 AND FIG. 6), by way of (for example a magnetic enclosure or an enclosure with a sticky double sided adhesive tape), If a body of water reach the height and/or position of where the user placed the said water over-flow detection circuit (45), the water over-flow detection sensor (45) will then output a signal to the input of the microcontroller (75) upon the main MCU unit (FIG. 1C), hence the main mcu unit (FIG. 1C) automatically turn both hot and/or cold electronic water valves (95) and (100) off until water is under the inputs of the said water over-flow detection (45) circuit. Once the water is under the water over-flow circuit (45) the apparatus can then be operated again.

Figure 2C:
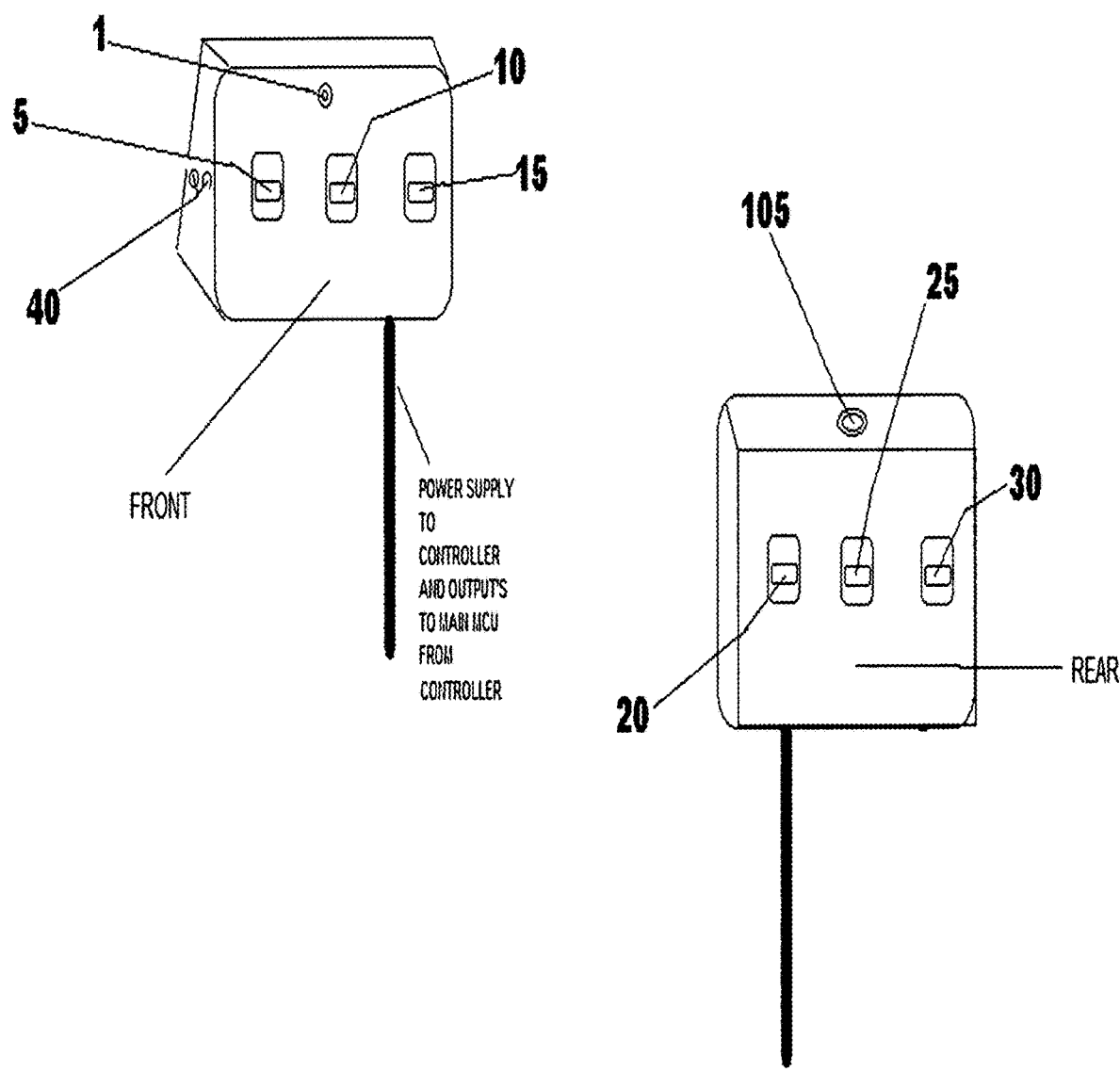
FIG. 2C Illustrates A model of the external enclosure for the Electronic Water Distribution Center's wired (version 2) push button with motion sensor controller, hence also depicts the inputs connections coming from each button(s), motion sensor(s), and water level detection circuit, which are all inputted to the main MCU unit, or inputted in the central controller if the main mcu unit and the central controller is embedded together as one single unit.

FIG. 2C Illustrates A model of the external enclosure for the Electronic Water Distribution Center's wired (version 2) temperature switch push button with embedded motion sensor central controller. The said version was invented for the user to be able to mount the temperature push button with embedded motion sensor central controller (FIG. 2A) and the main MCU unit (FIG. 2B AND FIG. 4) where ever the user wanted for their own convenience. For example: This unit is a two-piece unit that has the motion sensor and the temperature switch push buttons on one controller for the user only having to mount one controller unit. The user might want the temperature push button with embedded motion sensor controller (FIG. 2A) in the front of the sink because he/she is in a wheelchair and don't want to lift up to reach the motion sensor or the push-button central controls. It was created for the user to have more convenience with how the system is operated in their own home or business.

Figure 3A:
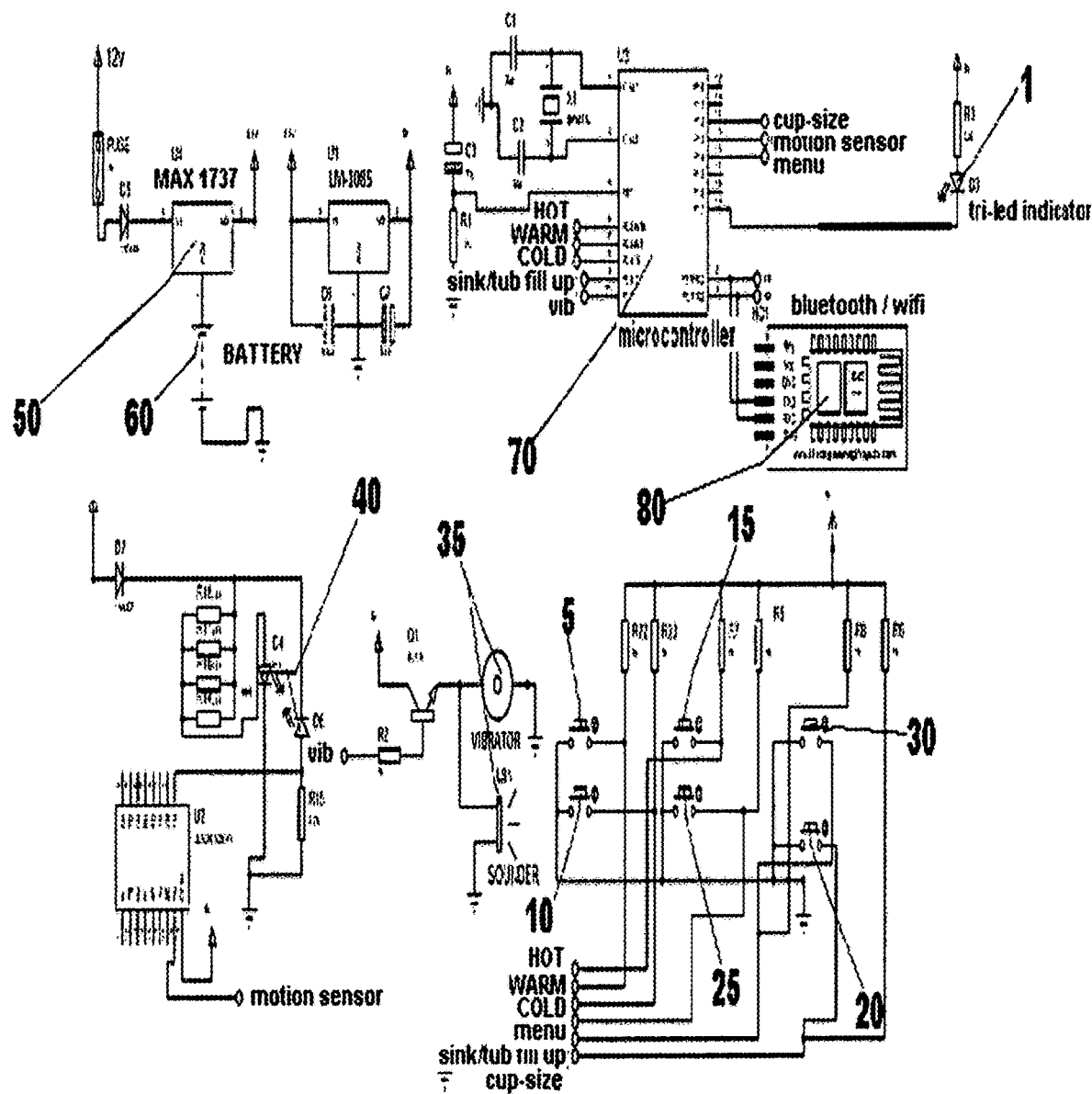
FIG. 3A Illustrates the Electronic Water Distribution Center's wireless push button with embedded motion sensor central controller's electronic schematics. This image also illustrates the inputs of each button(s), and motion sensor(s), which are all inputted to the on-board microcontroller. Lastly, this illustration depicts a bluetooth, wifi, and/or zigbee radio controller, which if a button was pressed upon the wireless central controller or if the motion sensor circuit was activated, to send and/or receive a wireless communication signal, to and from, the main mcu unit.
Figure 3B:
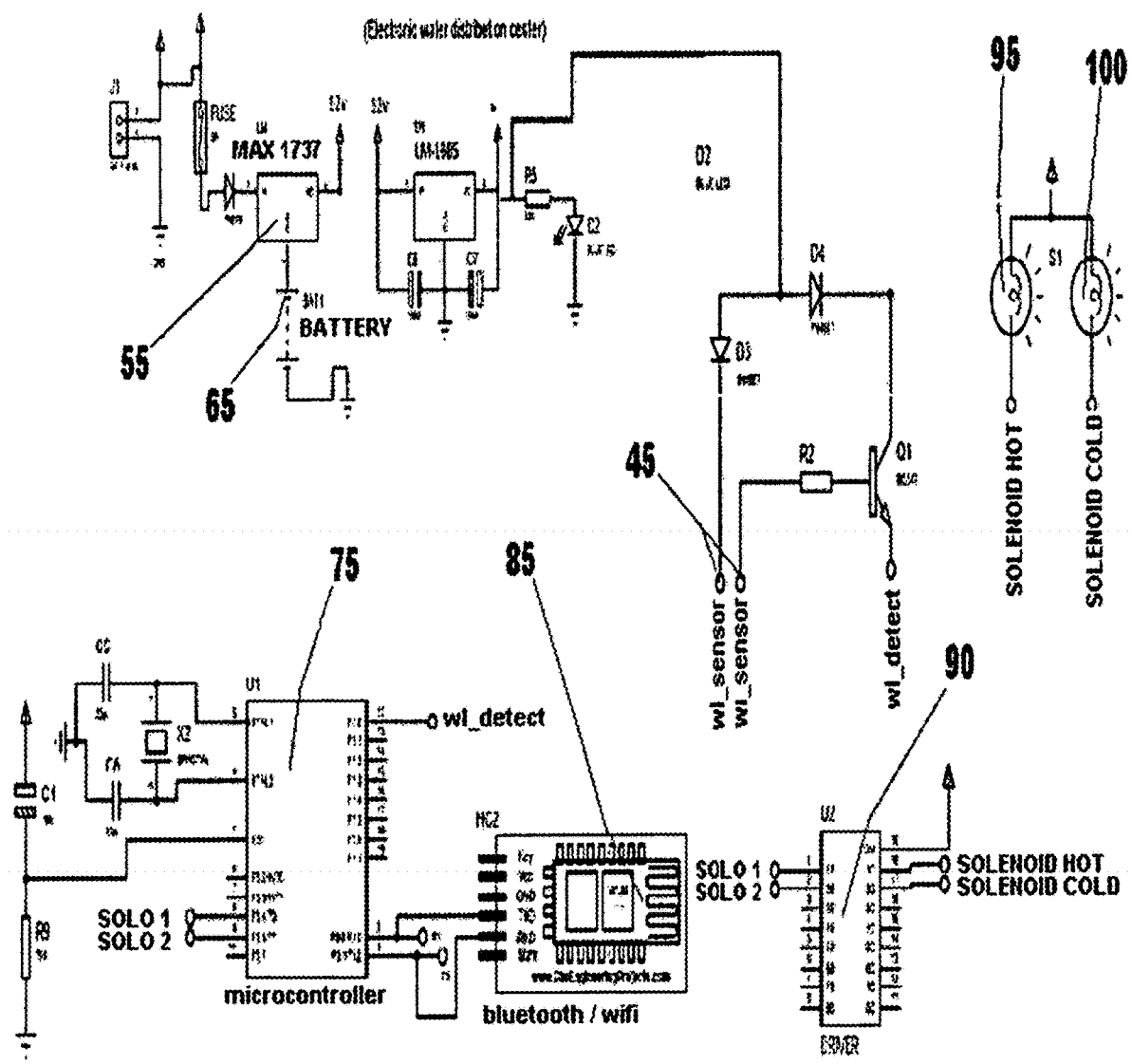
FIG. 3B Illustrates the Electronic Water Distribution Center's wireless main MCU unit electronic schematics. This image also depicts a bluetooth, wifi, and/or zigbee radio controller, which is connected to the on-board microcontroller of the main mcu unit, thus also depicts how the water level detector is connected to the main mcu unit. The said radio controller will send and/or receive a wireless communication signal, to and from, the wireless push button with embedded motion sensor central controller, to input a signal to the systems microcontroller, which output a signal to the said driver circuit. The driver circuit is utilized for the purpose of outputting a signal to actuate the plurality of electronic water valves, which are connected to the main MCU unit.

FIG. 3A Illustrates the Electronic Water Distribution Center's wireless temperature switch push button with embedded motion sensor central controller electronic schematics. The wireless temperature switch push button with embedded motion sensor central controller unit power supply source is constructed with, but not to be limited to, a maxim 1737 IC, which is a battery charger integrated circuit (50). The maxim 1737 is a lithium ion battery charger circuit (50) that charges the system embedded battery and also provide system power in unison; the system battery (60) is provided for a power outage situation and/or to operate the system by battery power and/or by solar. Once the system battery (60) reach full charge, the system battery (60) no longer is charging or is discharging unless dc wall jack plug has a power failure. The wireless temperature switch push-button central controller communicates with the main MCU (FIG. 3B) unit via a Bluetooth, Zigbee, WIFI, and/or radio controller signals. The motion controller circuit (40) is constructed with and infrared receiver transmitter package; the infrared transmitter and receiver is first, connected close together in proximity; the said transmitter emit an infrared beam signal into the atmosphere; if the user wave their hand or object in the range of the infrared transmitter/receiver package circuit, the infrared beam then bounces off of the object and is collected within the receiver to produce an output signal to interrupt the microcontroller (70); the motion controller circuit is utilized upon the apparatus to first, output water by way of motion from a human or an object; second, is utilized to output the last temperature and pressure that was pressed upon the temperature switch push button central controls to output for anytime use; third, is utilized to output a selected cup size of water, but not to be limited to, ranging from 1-5 cups, which is switched by the cup size button (30) upon the push button central controls. Now concerning the push-button controls; First, the said apparatus hot button (5), cold button (15), and/or warm button (10) is utilized upon the system for the user to output a selected water temperature and pressure from the said apparatus for a prolonged period of time; second, to select what water temperature and pressure the user want the motion sensor circuit (40) to operate on. The tri-led (1) is used to let user know what temperature of water that is coming out of the apparatus and/or what temperature the motion sensor circuit (40) is to operate on. third, the menu button (20) is there to select and change water depth mode and fill sink/tub mode; water depth mode allow the user to save a preferred amount of water that is used normally (to wash dishes or/and for bathing); sink/tub fill button (25) is to activate the saved water depth counter, temperature, and pressure. that was selected during the saving procedure by way of the press of a button. The c-size button (30) is the cup size select button. The c-size button (30) is used to select how many cups of water, but not to be limited to, between 1-5 cups of water can be selected, that is outputted by the motion sensor circuit (40). The vibrator and/or sounder circuit (35) is utilized on the system as an audio or physical indicator. For example: to let the user know that the water is on or off, that a certain mode is selected, or that the water depth level is saved. The vibrator and/or sounder circuit (35), is configured by utilizing a vibrator motor and/or a speaker or piezo buzzer in conjunction with the push button central controller, which are connected as outputs of the microcontroller (70) upon the central controller. The vibrator is utilized in the circuit, as a physical indicator to the user, which vibrate the wireless push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on. The sounder, as depicted is a speaker or piezo buzzer. The sounder will sound a audio sound/tone from the wireless push-button central controller if a button is pressed, if one or more motion sensor(s) are activated, if starting water depth fill-up mode, if starting or stopping sink/tub fill up mode, if one of the water level sensors is activated, and/or to let the user know how many cups of water the apparatus is on. The system microcontroller (70) is used for various functions and purposes. The microcontroller (70) holds the C++ program that accepts the inputs from the wireless temperature switch push button with embedded motion sensor central controller, hence the said wireless central controller's microcontroller (70) then outputs a signal to the main MCU unit (FIG. 3B), via ZIGBEE, BLUETOOTH, WIFI, and/or Radio Controller signal. (80), to the ZIGBEE, BLUETOOTH, WIFI, and/or Radio Controller upon the main mcu unit (FIG. 3B). Furthermore, the said radio controller then outputs a signal to the the main mcu unit's microcontroller (75), hence the microcontroller (75) then send an output signal to the selected driver circuit (90), which the said Driver circuit then output an amplified signal to actuate the hot water (95) and/or the cold water (100) electronic water valves, which then output the water temperature and pressure that was selected by the user. The microcontroller (75) also mean for the user to save their preferred water depth and output that saved water depth by pressing the sink/tub fill-up button (25) once. The push button central controller's microcontroller (70) means to send and receive data through its full duplex UART/USART system via ZIGBEE/BLUETOOTH/WIFI/Radio Control (80) to The Electronic Water Distribution Center's main mcu unit's (FIG. 3B) BLUETOOTH/WIFI/Radio Control (85) communication system for the means of communicating with the system's hot (95) or cold (100) electronic water valves. The Electronic Water Distribution Center also has either a ZIGBEE, BLUETOOTH, WIFI, and/or Radio Control (85) communication system for the means of communicating with the system via mobile device (android or apple), or from any computer device via a Bluetooth or WIFI device self-contained app; any device that is utilized to control the apparatus through ZIGBEE, Bluetooth, or WIFI (85) connectivity will have full control of the apparatus and will be able to control all of the apparatus's said functions from that device via the device application. The said ZIGBEE, BLUETOOTH, and/or WIFI Radio Control (85) communication system that are utilized in conjunction with the apparatus, is a commercially sold self contained module, that obtains an on-board antenna, an on-board radio signal controller, and a on-board microcontroller, which are all used to communicate with the main mcu unit's microcontroller (75).

FIG. 3B Illustrates the Electronic Water Distribution Center's wireless main MCU unit electronic schematics, which depicts how the push button with embedded motion sensor central controller and the water over-flow detect circuit (45) is connected to and/or communicate with the wireless main MCU unit. The water over-flow detect circuit connects directly to the side of the wireless main MCU unit. The main MCU unit power supply source is constructed with, but not to be limited to, a maxim 1737 IC, which is a battery charger integrated circuit (55). The maxim 1737 is a lithium ion battery charger circuit (55) that charges the system battery and also provide system power in unison; the system battery (65) is provided for a power outage situation and/or to operate the system by battery power and/or by solar. Once the system battery (65) reach full charge, the system battery (65) no longer is charging or is discharging unless dc wall jack plug has a power failure. The main mcu unit's system microcontroller (75) is used for various functions and purposes. The microcontroller (70) holds the C++ program that accepts the BLUETOOTH, WIFI, AND/OR ZIGBEE radio controller (85) inputs from the wireless temperature switch push button with embedded motion sensor controller (FIG. 3A). The said wireless central controller will then send a wireless signal to the main mcu unit's onboard BLUETOOTH, WIFI, AND/OR ZIGBEE radio controller (85), hence the main mcu unit's BLUETOOTH, WIFI, AND/OR ZIGBEE radio controller (85) output's a signal to the main mcu unit's microcontroller (75), furthermore, once the signal is received by microcontroller (75), the main mcu unit's microcontroller (75), then outputs a signal to the selected driver circuit (90), which is constructed with a Darlington pair, a half h-bridge, or a full h-bridge driver. The said Driver circuit then output an amplified signal to actuate the hot water (95) and/or the cold water (100) electronic water valves, which output the water temperature and pressure that was selected by the user. The said Darlington pair, half h-bridge, and/or a full h-bridge driver can operate, for example: a dc motor, a stepper motor, and/or electronic solenoid. The said driver integrated components above, for example, can also be used to reverse the polarity of a dc motor and/or stepper motor, which can and will be utilized in conjunction with this apparatus, to make a proportional valve go forward and/or backward or to make a solenoid valve actuate up or down. The microcontroller (75) also mean for the user to save their preferred water depth and output that saved water depth by pressing the sink/tub fill button (25) once. The microcontroller means (75) to send and receive data through its full duplex UART/USART system via ZIGBEE, Bluetooth, and/or WIFI Radio Control (85). The said ZIGBEE, Bluetooth, and/or WIFI Radio Control (85) communication system that are utilized in conjunction with the apparatus, is a commercially sold self contained module, that obtains an on-board antenna, an on-board radio signal controller, and a on-board microcontroller, which are all used to communicate with the main mcu unit's microcontroller (75). The Electronic Water Distribution Center's has a ZIGBEE, BLUETOOTH, WIFI, or Radio Control (85) communication system for the means of also communicating with the system via mobile device (android or apple), the Electronic Water Distribution Center temperature switch push button with embedded motion sensor controller, or from any computer device via a Bluetooth or WIFI device, with a self-contained app. Any device that is utilized to control the apparatus through ZIGBEE, Bluetooth, or WIFI (85) connectivity will have full control of the apparatus and will be able to control all of the apparatus's said functions from that device via the device application. The water over-flow detection circuit (45) is configured with a low frequency/fast switching/ultra-low current sensing/audio transistor. A small positive input signal is applied through an fast switching 1n4148 diode and the low frequency audio amplifier is utilized to produce the output signal to the microcontroller. The water over-flow detector (45) is connected to the side of the user sink, as shown later in (FIG. 5 AND FIG. 6), by way of (for example a magnetic enclosure or an enclosure with a sticky double sided adhesive tape) If a body of water reaches the input signal of the water over-flow detection circuit sensors (45), the water over-flow detection sensor (45) will then output a signal to the main mcu unit's microcontroller (75), hence automatically turn both hot and/or cold electronic water valves (95) and (100) off until water is under the input's of the water over-flow detection (45) circuit. Once water is under the water over-flow circuit (45) the apparatus can then be operated again.

Figure 3C:
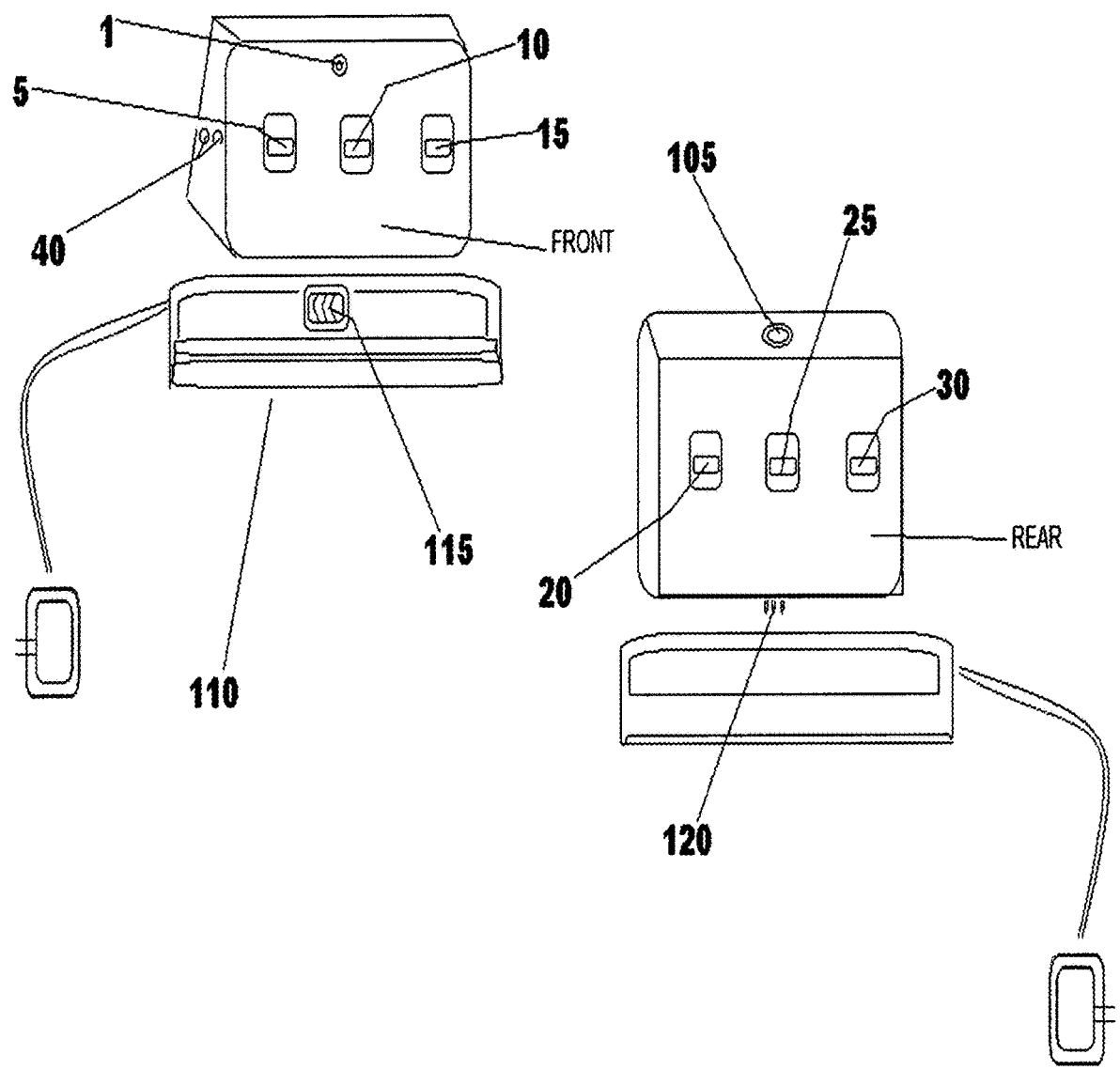
FIG. 3C Illustrates A model of the external enclosure for the Electronic Water Distribution Center's wireless push button with motion sensor controller and its charging dock.

FIG. 3C Illustrates A model of the external enclosure for the Electronic Water Distribution Center's wireless temperature switch push button with embedded motion sensor central controller. The wireless Temperature switch push button with embedded motion sensor central controller has a power switch (105) located on the side of the device. The said temperature push-button central controller is equipped with a charging dock (110) with the charging connections (115) and (120) on the bottom of the central controller; the said Temperature switch push button with embedded motion sensor central controller can plug into any wall outlet to charge and also have a very wide bluetooth, wifi, zigbee, and/or radio controlled communication range, but not to be limited to 40 ft. The said ZIGBEE, Bluetooth, and/or WIFI Radio Control (85) communication system is utilized with this apparatus in order to communicate with the apparatus without having to use a infrared remote, which only can operate if you are pointing the infrared remote directly at the sensor. The ZIGBEE, Bluetooth, and/or WIFI Radio Controller (85) module contains an on-board antenna, an on-board radio signal controller, and a on-board microcontroller, Using a radio controlled type of communication system allows operation of the apparatus from anywhere around the users home and/or business, hence also the wifi module allow a internet connection to operate the apparatus from anywhere in the world. The wireless apparatus can be assembled to any home and/or business plumbing in less than 10 minutes without the need for a plumber.

Figure 4:
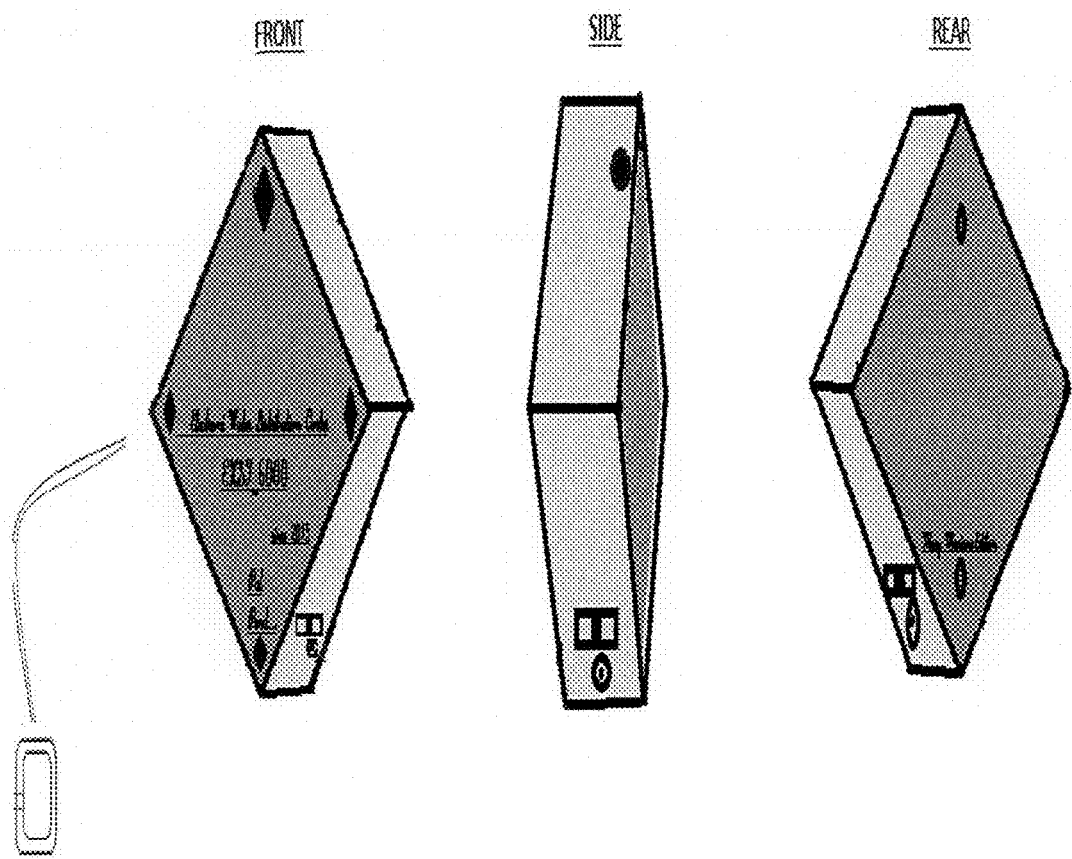
FIG. 4 Illustrates A model of the external enclosure for the Electronic Water Distribution Center's wired and wireless main MCU unit.

FIG. 4 Illustrates a model of the external enclosure for the Electronic Water Distribution Center's wired and/or wireless main MCU unit. The main MCU unit and the enclosure will be utilized for all units, accept for when the wired versions main mcu electronic components and the wireless push button central controller's electronic components are embedded on a single pcb board. This will allow the entire apparatus to be housed in one single enclosure. The main MCU unit, as well as all of the other stated controller units within this patent, all are constructed with waterproof plastics and/or metal enclosure; for this reason, there is a zero percent chance for the system to malfunction and cause some type of electrical shock to the user. The main mcu unit, if its not embedded with the wired push button central controller, can be hung on a wall, under the sink, and even under the house. If the wireless central controller and the main mcu is both embedded in one single enclosure, it will be a one piece apparatus, which the module will have to be mounted close around the sink. The reason it will be necessary to mount the apparatus close to the sink is because, the electronic water valves, the water level detection circuit, and/or the external motion sensor will have to be inputted to the system either on the side or behind the system enclosure. The main MCU storage depends solely on the user preference.

Figure 5:
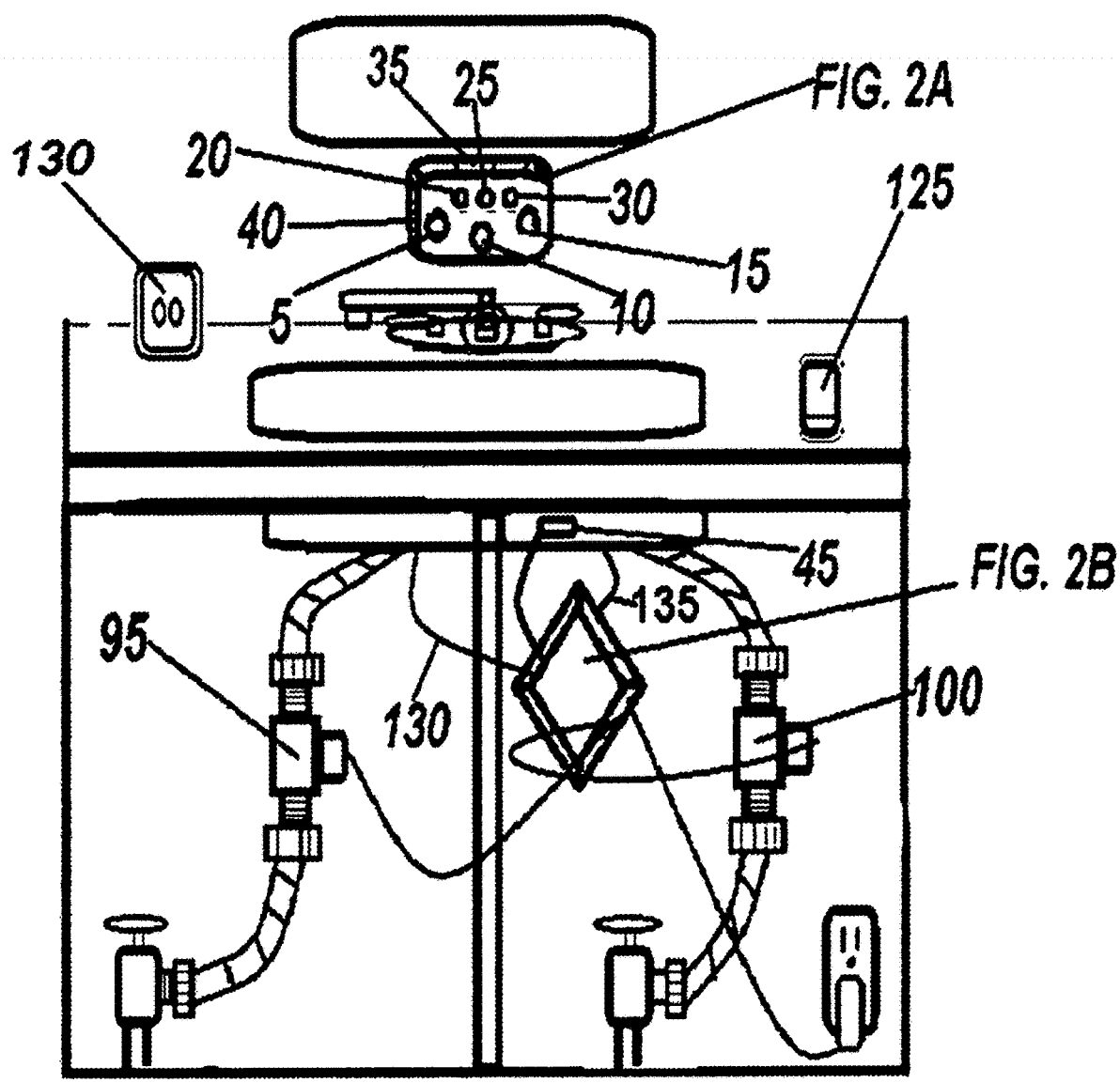
FIG. 5 Illustrates the Electronic Water Distribution Center's wired versions push button central controller with internal and/or external motion sensor circuits (FIG. 1D, and FIG. 2C), in conjunction with the wired main MCU unit electronic controller.

FIG. 5 Illustrates the Electronic Water Distribution Center's wired temperature switch push button central controller (FIG. 2A), the internal and/or external motion sensor controllers (40) and (130), the water level detection circuit (45), and the main MCU unit (FIG. 2B). This image also depicts how the vibrator/sounder circuit is utilized within the apparatus. The illustration also depicts how all, said circuits above, connect with the components (135) in the wired main MCU unit (FIG. 26), which control the water flow through the, Hot (95) and/or cold (100) electronic water valves to achieve numerous functions. The numerous functions being, touch-less operations via one of the motion sensor(s) circuits, the user can select an exact measurement of water for the apparatus to output via the cup-size button (30), the user can output the exact measurement of water selected via a touch-less operation's utilizing the motion sensor(s) circuit ((s) (40) and (130), how the water level detection circuit (45) operates, how to set and start one of the plurality of water depth mode settings utilizing the menu (20) and sink/tub fill-up button (25), and how the vibrator/audio indicator works. The said apparatus utilizes four main circuits. The first main circuit that the apparatus utilizes is the temperature push button central controller (FIG. 2A). The second main circuit being the water level detect circuit (45). The third main circuit being the internal and/or external motion sensor controller (40). The fourth main circuit, if the main mcu unit and the central controller are not embedded as one unit, will be the main MCU unit (FIG. 1C, FIG. 2B, and FIG. 4). All outputs of the first three stated circuits, which the first being the wired Temperature push button central controller ((FIG. 1B) and (FIG. 2A)), the second being the water level detect circuit (45), and the third being the external motion sensor controller ((FIG. 1A (40)), (FIG. 2A (40)) and (130), are all wired to the inputs of the main mcu unit ((FIG. 1C) and (FIG. 2B)), unless the main mcu unit components are embedded with the components for the push button controller. If all components for the main mcu unit and all the central controller components are embedded on one pcb board, this will allow the apparatus to have one enclosure, hence in the case of having one enclosure, the external motion sensor (130) and the water level detection circuit (45) will connect directly to the wired push-button central controller ((FIG. 1B) and (FIG. 2A)). First, Connect the input for the hot (95) and cold (100) Electronic Water valves to the output coming from the plumbing hot and cold riser lines, hence connect the output of the Electronic water valves to the input of the users manual or electronic faucet hot and cold water inlet supply lines. Once connected, the wired push button central controller ((FIG. 1B) and (FIG. 2A)) contains a plurality of buttons, which are utilized to control the hot water (5), cold water (15), warm water (10), menu (20), cup-size (30), and sink/tub fill up (25). The internal (40) and/or external motion sensor circuits (130) are utilized for touch-less and/or wireless operations. The water level detect circuit (45), if water is detected, send a output control signal to the input of the main MCU unit (FIG. 2B). The main MCU unit (FIG. 26) then send a wired output control signal to the driver circuit, which output a control signal to The hot (95) and/or cold (100) electronic water valves that is connected to the users hot and/or cold water supply lines. The main MCU unit (FIG. 1C) and (FIG. 2B) can also be fully controlled by any mobile device (125) via its bluetooth, wifi, and/or zigbee radio controlled circuit. In this particular version, The bluetooth, wifi, and/or zigbee circuit is only utilized for computer or mobile communications. The mobile device (125) application will consist of the exact functionalities as the wired temperature push button central controller (FIG. 2A). In return, giving the mobile cellular device (125) full control of the Electronic Water Distribution Center. The cup size function operates without any sensors to measure the range of water outputted from the spout. First, the user has to have both hot and cold manual faucet on/off control's all the way on. The cup size function, as mentioned in (FIG. 1B, FIG. 2A, AND FIG. 3A), was configured by knowing that all homes water pressure range from 80-85 psi. With that in mind, all homes have a standardized pressure range. Now, all that had to be done was to measure the time and the space of half cup or one cup of water coming out of the user's faucet. The microcontroller is utilized to: For example, if half cup of water took 1.5 seconds to be dispensed from the spout, we then multiply that 1.5 seconds×2, which equal one cup of water taking 3 seconds to be dispensed from the water spout, or if one quart equals four cups of water, we then multiply 3 seconds (time one cup take to dispense)×4 to achieve a precise quart (etc). The The electronic water valves hot (95) and cold (100) used in conjunction with the Electronic Water Distribution Center will actuate fully on. Once the hot (95) and cold (100) electronic water valves actuate fully on, this now allows the same 80-85 psi water pressure to be delivered to the apparatus, hence allow the Electronic Water Distribution Center to time the precise cup size measurement for all homes and businesses. Now concerning the temperature push-button controls (FIG. 16) and (FIG. 2A); First, the said apparatus hot button (5), cold button (15), and/or warm button (10) is utilized upon the system for the user to output a selected water temperature and pressure, from the said apparatus, for a prolonged period of time. Second, the temperature push-button's central controller's hot (5), warm (10), and cold (15) buttons (FIG. 16) and (FIG. 2A) is to select what temperature and pressure of water is outputted from the users faucet once the motion sensor is activated. Meaning, what ever temperature and pressure the apparatus was on last, will be outputted out of the users faucet anytime they activate the motion sensor circuit(s)(40) and/or (130). The menu button (20) is there to select and change the temperature and counter settings in water depth mode. Once water depth mode is set, it enables the user to utilize the fill sink/tub button (25). Water depth mode allow the user to save a plurality of preferred depths of water that is used normally (to wash dishes or/and to get in the tub). Sink/tub fill up button (25) is to activate the saved water depth, temperature, and pressure that was selected during the saving procedure by way of the press of that particular button and/or input signal. The water depth saving mode was configured by utilizing a counter program within the main mcu units microcontroller (75). Once the user select to change water depth mode in the menu, the user should select the temperature and pressure from the wireless temperature push button central controller (FIG. 2A). After the user has selected there preferred water temperature, the temperature push button controller (FIG. 1B) and (FIG. 2A) will then send a control signal to the main mcu unit (FIG. 26), hence the main mcu unit (FIG. 1C) and (FIG. 2B) will send a control signal to the electronic water valves, hot (95) and/or cold (100), to turn the water on. Next, the main mcu unit (FIG. 1C) and (FIG. 2B) microcontroller (75) will then start a counter program to count, in seconds, the time it takes for the user to finish filling there sink or tub. Once the user has reached there preferred depth, the user should press the menu button to save the time from the counter program. Once set, if the user press the sink/tub fill up button (25) on the central controller or on there mobile device, the central controller or the mobile device will then send a output signal to the main mcu unit (FIG. 2B). Once, the main mcu unit (FIG. 1C) and (FIG. 2B) receive that said signal, It will then send a output signal to actuate the hot (95) and/or cold (100) electronic water valves on for the same water temperature and pressure selected and saved during the water depth fill up mode, hence will start the counter program to start counting down from the users saved time period until it reaches zero. Once the counter reaches zero, the main MCU unit (FIG. 1C) and (FIG. 2B) then will send a second output control signal to actuate the Hot (95) and/or cold (100)

electronic water valves OFF. Once the water is Actuated off, for example: the vibrator will vibrate the central controller and/or the sounder (35) will audibly make a tone or audibly say "water turning off" from the central controller, which let the user know that the sink/tub fill up mode is complete. This allow the user to not have to watch there water while waiting to wash there dishes and/or fill there tub up. The water over-flow detector (45) is connected to the side of the user sink (s), as shown in both (FIG. 5 AND FIG. 6), by way of (for example a magnetic enclosure or an enclosure with a sticky double sided adhesive tape). If a I body of water reach the height and/or position of where the user placed the said water over-flow detection circuit (45), the water over-flow detection sensor (45) will then output a signal to the input of the microcontroller (75) upon the main MCU unit (FIG. 1C) and (FIG. 2B), hence the main mcu unit (FIG. 1C) and (FIG. 2B) automatically turn both hot (95) and/or cold (100) electronic water valves off until the water level is positioned under the inputs to the water over-flow detection (45) circuit. Once the water is under the water over-flow circuit (45), the apparatus can then be operated again. The water over-flow detector (45) circuit as depicted in, (FIG. 1A, FIG. 2B, and FIG. 3B), can attach a plurality of water over flow detection devices, hence (FIG. 0.6) illustrates the uses for a plurality of water over-flow detection sensors. The vibrator and/or sounder circuit (35), as mentioned in (FIG. 1B, FIG. 2A, and FIG. 3A), is utilized on the system as an audio and/or physical indicator. The vibrator and/or sounder circuit (35), is configured by utilizing the inputs of microcontroller (75) of the main mcu unit ((FIG. 1C) and (FIG. 2B) for version one, and utilizes microcontroller (70) of the wireless push button central controller for version 3. The vibrator is a very small dc vibrator motor, which is utilized in the circuit as a physical indicator to the user, which vibrate the Temperature switch push-button central controller if a button is pressed, if one or more motion sensor(s) are activated, if starting water depth fill-up mode, if starting or stopping sink/tub fill up mode, if the water level sensor is activated, and/or to let the user know how many cups of water the apparatus is on. The vibrator is used for ex: if the temperature switch push button controller's buttons are pressed to signal the Main mcu unit to actuate the water on, the vibrator will vibrate the controller for half of a second; if the temperature switch push button controller's buttons are pressed to signal the Main mcu unit to actuate the water off, the vibrator will vibrate the controller for a full second; if if one or more motion sensor(s) are activated, the vibrator will vibrate the controller for the the entire time period it takes for the apparatus to actuate the water on and automatically actuate the water back off; if setting sink/tub fill up mode the vibrator will vibrate the controller for three seconds; if user is done setting sink/tub fill up mode, the vibrator will vibrate the controller for six seconds; if starting water depth fill-up mode, once the water starts to fill up, the vibrator will vibrate the controller for three seconds, if water depth fill-up mode is done, the vibrator will vibrate the controller for six seconds when the water is done filling up; if the water level sensor is activated, it will vibrate the controller for 2 seconds; if cup-size button is pressed the vibrator will vibrate a half second for half a cup of water, if one cup of water is selected, the controller will vibrate for one full second to represent one cup; if one and a half cup of water is selected, the controller will vibrate for one full second, pause for a quarter of a second then vibrate again for a half a second to represent one and a half cups; if two cups of water is selected, the controller will vibrate for one full second, pause for a quarter of a second, hence vibrate again for one second to represent two cups (etc). The sounder, as depicted in ((FIG. 1B), (FIG. 2A), AND (FIG. 3A)), is a speaker or piezo. The sounder is utilized in the circuit as a audio indicator to the user; the sounder will sound aloud, a audio tone or speech, from the Temperature switch push-button central controller's speaker/piezo if a button is pressed, if one or more motion sensor(s) are activated, if starting water depth fill-up mode, or if stopping water depth fill-up mode, if the water level sensor is activated, and/or to let the user know how many cups of water the apparatus is on. The sounder is used for ex: if the temperature switch push button central controller's buttons are pressed to signal the Main mcu unit to actuate the water on, the sounder will sound a audio tone or speech from the central controller; if the temperature switch push button central controller's buttons are pressed to signal the Main mcu unit to actuate the water off, the sounder will sound a audio tone or speech from the central controller; if one or more motion sensor(s) are activated, the sounder will sound a audio tone or speech from the central controller for the the entire time period it takes for the apparatus to actuate the water on and automatically actuate the water back off; if setting sink/tub fill up mode the sounder will sound a audio tone or speech from the central controller for three seconds; if user is done setting water depth mode, the sounder will sound a audio tone or speech from the controller for six seconds; if starting water depth fill-up mode, once the user press the sink/tub fill up button (25) and the water starts to fill up, the sounder will sound a audio tone or speech from the controller for three seconds, if water depth fill-up mode is done, the sounder will sound a audio tone or speech from the controller for six seconds when the water is done filling up; if the water level sensor is activated, the sounder will sound a audio tone or speech from the controller for 2 seconds; if cup-size button is pressed the sounder will sound a audio tone or speech from the controller for a half second to represent a half cup of water and/or audibly say "half cup", if one cup of water is selected, the sounder will sound a audio tone or speech from the controller for one full second and/or audibly say "one cup" to represent one cup; if one and a half cup of water is selected, the sounder will sound a audio tone or speech from the controller for one full second and/or audibly say "one and a half cup", pause for a quarter of a second then sound a second audio tone or speech again for a half a second to represent one and a half cups; if two cups of water is selected, the sounder will sound a audio tone or speech for one full second and/or audibly say, "two cup", pause for a quarter of a second, hence will sound a audio tone or speech a second time for one second to represent two cups (etc).

Figure 6:
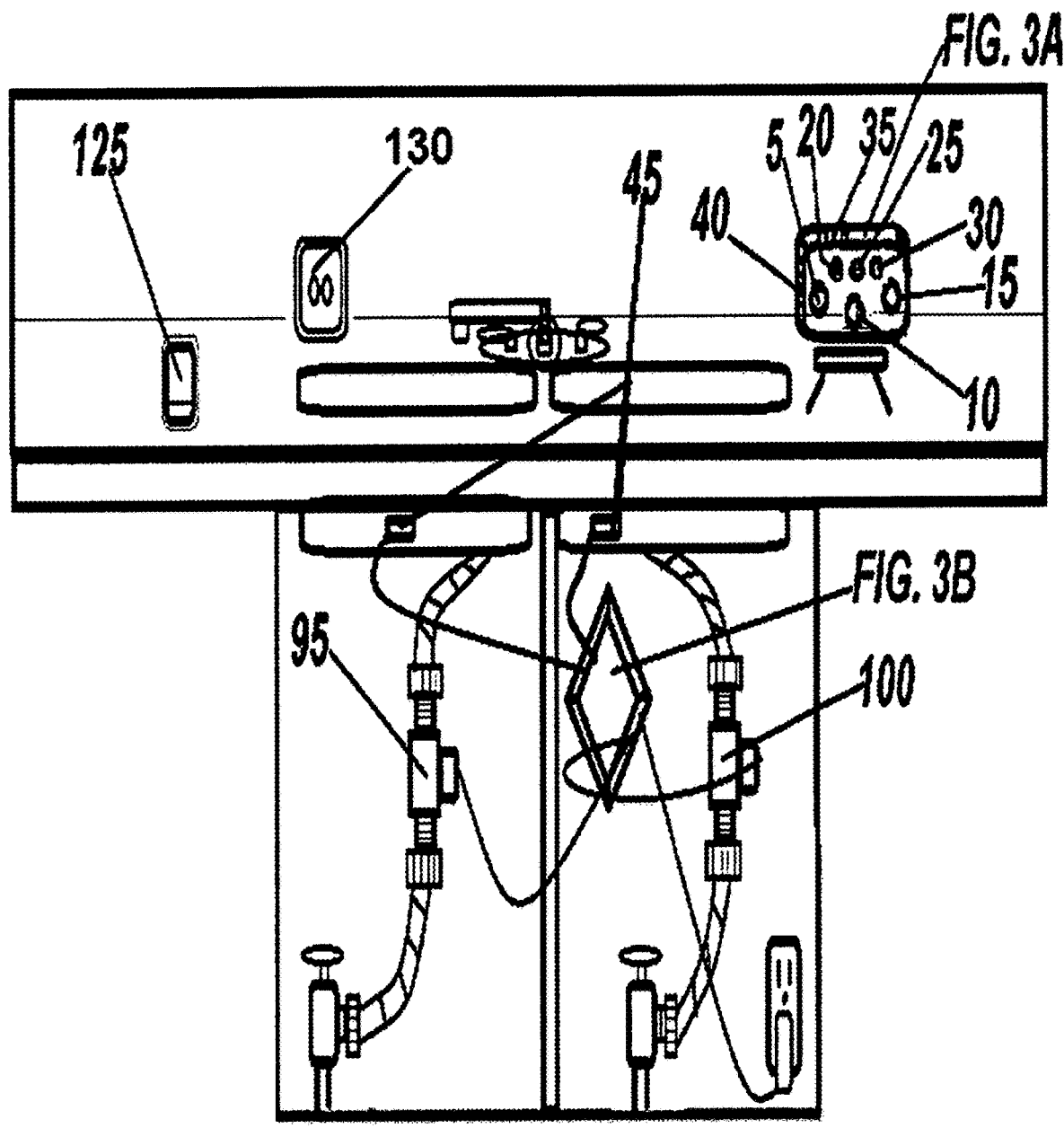
FIG. 6 Illustrates the Electronic Water Distribution Center's Wireless versions push button central controller with internal and/or external motion sensor circuits (FIG. 1A AND FIG. 3A) in conjunction with the wireless main MCU unit electronic controller (FIG. 3B and FIG. 4), hence depicts the apparatus connected to the kitchen sink. This image also depicts how the mobile device and/or the wireless push button central controller with internal and/or external motion sensor controller sends a wireless output signal and the water level detection circuits send a wired and/or wireless output signals, which all said signals are utilized to control the wireless main MCU unit, hence also depicts how the main mcu unit electronically control the plurality of electronic water valves.

FIG. 6 Illustrates the Electronic Water Distribution Center's wireless temperature switch push button central controller (FIG. 3A), the internal (40) and/or external (130) motion sensor controllers, the water level detection circuit (45), the vibrator/sounder (35) circuit, and the main MCU unit (FIG. 3B). The illustration also depicts how all, said circuits above, connect with the wireless main MCU unit (FIG. 3B), to control the water flow through the Hot (95) and/or cold (100) electronic water valves. The said apparatus utilizes four main circuits. The first main circuit that the apparatus utilizes is the wireless temperature push button central controller (FIG. 3A). The second main circuit is the main MCU unit (FIG. 3B). The third main circuit being the external motion sensor controller (40). The fourth main circuit being the water level detect circuit (45). These four units, in this particular version, need to be connected in the following order, to have full control of the water supply lines of the users kitchen faucet/sink. The first connection that need to be made is: Connect the input for the hot (95) and cold (100) Electronic Water valves to the output coming from the plumbing hot and cold riser lines, hence connect the output of the Electronic water valves to the input of the users manual or electronic faucet hot and cold water inlet supply lines. Next, the wireless temperature push button central controller (FIG. 3A), which is connected, once powered on, by automatically sending and/or receiving a wireless bluetooth, wifi, zigbee, or radio controlled communication signal to and/or from the wireless control signal to the bluetooth, wifi, zigbee, or radio controller signal of the wireless main MCU unit (FIG. 3B). The said ZIGBEE, Bluetooth, and/or WIFI Radio Control (85) communication system is utilized with this apparatus in order to communicate with the apparatus without having to use a infrared remote, which a infrared remote can only operate if you are pointing the infrared remote directly at the sensor. The ZIGBEE, Bluetooth, and/or WIFI Radio Controller (85) is a commercially sold module that contains an on-board antenna, an on-board radio signal controller, and a on-board microcontroller, Using a radio controlled type of communication system allows operation of the apparatus from anywhere around the users home and/or business, hence the said radio controller devices also allow a internet connection to operate the apparatus from anywhere in the world. The second connection that need to be made is: The user need to connects the wired and/or wireless communication output signal from the external motion sensor controller(s) (130), to input a wired and/or wireless connection to the wireless main mcu unit (FIG. 3B). If the user has a wireless external motion sensor circuit (FIG. 1A (40)) and (130), once powered on, the wireless motion sensor circuit will automatically broadcast a signal to connect to the wireless main mcu unit's (FIG. 3B) bluetooth, wifi, and/or zigbee radio controller, hence send a wireless and/or touch-less signal to the main mcu unit, which signals to operate the actuation of the hot (95) and/or cold (100) electronic water valves. If the user has a wired external motion sensor circuit (FIG. 1A (40) and (130), the wired motion sensor circuit connects directly to the wired input upon the wireless main mcu unit (FIG. 3B), hence send a wired signal to the main mcu unit, which signals to operate the actuation of the hot (95) and/or cold (100) electronic water valves. The internal embedded motion sensor (40), (FIG. 2A (40)), and, (FIG. 3A (40)) is connected to the microcontroller (70), in conjunction with the push button central controller (FIG. 2A) and (FIG. 3A), which mean that the wireless push button central controller's embedded motion sensor circuit (40) also sends a touch-less and/or wireless signal to the wireless main mcu unit (FIG. 3A), hence the said main mcu unit (FIG. 36) will actuate the hot (95) and/or cold (100) electronic water valves. The Third connection that need to be made is: The water level detection sensors (45) has a wired output connection signal, which connects and send a wired input signal to the inputs of the main mcu unit (FIG. 3B). Once the wireless temperature push button central controller (FIG. 3A), the internal and/or external motion sensor circuit (40) (130), and/or the water level detect circuit (45) is connected to the main mcu unit, hence send there output control signals to the input of the main MCU unit (FIG. 3B). The main MCU unit (FIG. 3B) then will send a wired output control signal to the driver circuit, which in turn, output a signal to control the hot (95) and/or cold (100) electronic water valves which is connected to the users hot and/or cold water supply lines. Once, the main MCU unit (FIG. 36) send the control signal to the driver, which output a signal to actuate the electronic water valves(s) selected by the user, the main MCU unit (FIG. 36) then send a feedback signal to the wireless Temperature Switch push button with embedded motion sensor central controller (FIG. 3B) to signal the tri-led circuit (FIG. 1B (1)), (FIG. 2A (1)), AND (FIG. 3A (1)) to light up a representative color. A representative color meaning, if the user press the hot water button (5) up or down, the apparatus will actuate the hot (95) electronic water valve, hence the feed back system will, dim if actuating down or brighten if actuating up, the red led on the wireless push button central controller (FIG. 3A); if the user press the warm water button (10) up or down, the apparatus will actuate the hot (95) and cold (100) electronic water valves together, hence the feed back system will, dim if actuating down or brighten if actuating up, the green led on the Temperature Switch push button central controller (FIG. 3A), or if the user press the cold water button (15) up or down, the apparatus will actuate the cold (100) electronic water valve, hence the feed back system will, dim if actuating down or brighten if actuating up, the blue led on the Temperature Switch push button central controller (FIG. 3A). The main MCU unit (FIG. 3B) circuit can also be fully controlled by any mobile device, via the main mcu unit's ((FIG. 1C), (FIG. 2B), and (FIG. C)) said bluetooth, wifi, and/or zigbee radio controller. The mobile device (125) application will consist of the exact functionalities as the temperature push button central controller ((FIG. 1B), (FIG. 2A), and (FIG. 3A)). In return, giving the mobile cellular device (125) full control of the Electronic Water Distribution Center or a plurality of Electronic Water Distribution center systems from one central device or mobile device application. The cup size function, as mentioned in (FIG. 1B, FIG. 2A, AND FIG. 3A), operates without any sensors or hardware needed to measure the range of water outputted from the spout. First, the user has to have both hot and cold manual faucet on/off control's all the way on. The cup size function was configured by knowing that all homes water pressure range from 80-85 psi. With that being said, all homes have a standardized pressure range. Now, all that had to be done was to measure the time and the space of half cup or one cup of water coming out of the user's faucet. The microcontroller is utilized to: For example, if half cup of water took 1.5 seconds to be dispensed from the spout, we then multiply that 1.5 seconds×2, which equal one cup of water taking 3 seconds to be dispensed from the water spout, or if one quart equals four cups of water, we then multiply 3 seconds (time one cup take to dispense)×4 to achieve a precise quart (etc). The electronic water valves, both hot (95) and cold (100), used in conjunction with the Electronic Water Distribution Center will first actuate fully on. Once the hot (95) and cold (100) electronic water valves actuate fully on, this now allows the same 80-85 psi water pressure to be delivered to the apparatus, hence allow the Electronic Water Distribution Center to time a precise water measurement for all homes and businesses. Now concerning the wireless temperature push-button controls (FIG. 3A). First, the said apparatus hot button (5), cold button (15), and/or warm button (10) is utilized upon the system for the user to output selected water temperature and pressure from the said apparatus for a prolonged period of time. Second, the wireless temperature push-button central controller controls (FIG. 3A) is to select what temperature and pressure of water is outputted from the users faucet once the users set motion sensor is activated. Meaning, the user can set a certain motion sensor (40) and/or (130) to activate the temperature and pressure the apparatus was on last, hence the water will be outputted out of the users faucet anytime they activate the set motion sensor circuit(s)(40) or (130). The menu button (20) is there to select and change the temperature and counter settings in water depth modes, to set power saving modes, and to turn the vibrator and/or sounder circuit on or off. Once water depth modes is set, it enables the user to utilize the fill sink/tub mode button (25). Water depth modes allow the user to save a preferred depths of water that is used normally (to wash dishes or/and to get in the tub). Sink/tub fill up button (25) is to activate the saved water depths counter, temperature, and pressure that was selected during the saving procedure by way of the press of that particular button or input signal. The water depth saving for sink/tub fill up was configured by utilizing a counter program within the microcontroller. Once the user select to change a water depth mode in the menu, the user should select the temperature and pressure from the wireless temperature push button central controller (FIG. 3A). After the user has selected there preferred water temperature and pressure, the temperature push button central controller (FIG. 3A) will then send a control signal to the main mcu unit (FIG. 3B), hence the main mcu unit (FIG. 3B) will send a control signal to the driver circuit, which outputs a signal to actuate the electronic water valves, hot (95) and/or cold (100), to turn the water on. Next, the central controller's (FIG. 3A) microcontroller (70) and/or the main mcu unit's (FIG. 3B) microcontroller (75) will then start a counter program to count, in seconds, the time it takes for the user to finish filling there sink and/or tub. Once the user has reached there preferred depth, the user should press the menu button to save the time from the counter program. Once setting is saved, the hot (95) and/or cold (100) electronic water valves will automatically actuate fully off. If the user want to start that saved water depth, the user should press the sink/tub fill up button (25) upon the central controller or the mobile device, Once pressed or signaled, the temperature push-button central controller (FIG. 3A) or the mobile device (125) then send a wireless output signal to the wireless main mcu unit (FIG. 3B). Once the main mcu unit (FIG. 3B) receive that said signal, It will then actuate the hot (95) and/or cold (100) electronic water valves on for the same water temperature and pressure, selected and saved, during the water depth fill up mode, hence will start the counter program to start counting down from the saved time until it reaches zero. Once the counter reaches zero, the main MCU unit (FIG. 3B) then will send an second output control signal to the driver circuit, which outputs a signal to actuates the Hot (95) and/or cold (100) electronic water valves fully off. Once the water is actuated off, the vibrator will vibrate and/or the sounder will audibly for example: make a tone and/or say "water turning off", to let you know that the sink/tub fill up mode is complete. This allow the user to not have to watch there water while waiting to wash there dishes and/or fill there tub up. The water over-flow detector (45) is connected to the side of the user sink (s), as shown in both (FIG. 5 AND FIG. 6), by way of (for example a magnetic enclosure or an enclosure with a sticky double sided adhesive tape). This particular illustration depicts a plurality of water overflow sensors, which is also depicted in (FIG. 1A, FIG. 2B, AND FIG. 36). If a body of water reach the height and/or position of where the user placed any of the said water over-flow detection sensor (45), the water over-flow detection sensor (45) will then output a signal to the input of the microcontroller (75) upon the main MCU unit (FIG. 3B), hence the main mcu unit (FIG. 3B) will then output a signal to the driver circuit, which automatically turn both hot (95) and/or cold (100) electronic water valves off until the water is positioned under the inputs to the water over-flow sensor (45). Once the body of water is under the water over-flow circuit (45), the apparatus can then be operated again. The vibrator and/or sounder circuit (35), as mentioned in (FIG. 1B, FIG. 2A, and FIG. 3A), is utilized on the system as an audio signal and/or physical indicator. The vibrator and/or sounder circuit (35), is configured by utilizing the inputs of microcontroller (70) of the wireless push button central controller, The vibrator is a very small dc vibrator motor, which is utilized in the circuit as a physical indicator to the user, which vibrate the wireless Temperature switch push-button central controller (FIG. 3B) if a button is pressed, if one or more motion sensor(s) are activated, if starting water depth fill-up mode, if starting or stopping sink/tub fill up mode, if the water level sensor is activated, and/or to let the user know how many cups of water the apparatus is on. The vibrator (FIG. 3A (35)) is used for ex: if the temperature switch push button controller's buttons are pressed to signal the Main mcu unit to actuate the water on, the vibrator will vibrate the controller for half of a second; if the temperature switch push button central controller's buttons are pressed to signal the Main mcu unit to actuate the water off, the vibrator will vibrate the controller for a full second; if one or more motion sensor(s) (40)(130) are activated, the vibrator (35) will vibrate the controller for the the entire time period it takes for the apparatus to actuate the water on and automatically actuate the water back off; if setting sink/tub fill up mode the vibrator will vibrate the controller for three seconds; if user is done setting sink/tub fill up mode, the vibrator (35) will vibrate the controller for six seconds; if starting water depth fill-up mode, once the water starts to fill up, the vibrator (35) will vibrate the controller for three seconds, if water depth fill-up mode is done, the vibrator will vibrate the controller for six seconds when the water is done filling up; if the water level sensor is activated, it will vibrate the controller for 2 seconds; if cup-size button is pressed the vibrator (35) will vibrate a half second for half a cup of water, if one cup of water is selected, the controller will vibrate for one full second to represent one cup; if one and a half cup of water is selected, the controller will vibrate for one full second, pause for a quarter of a second then vibrate again for a half a second to represent one and a half cups; if two cups of water is selected, the controller will vibrate for one full second, pause for a quarter of a second, hence vibrate again for one second to represent two cups (etc). The sounder, as depicted in ((FIG. 1B (35)), (FIG. 2A (35)), AND (FIG. 3A (35))), is a speaker or piezo. The sounder (35) is utilized in the circuit as a audio indicator to the user, to sound out a tone or speech, from the Temperature switch push-button controller's speaker if a button is pressed, if one or more motion sensor(s) (130) and (40) are activated, if starting water depth fill-up mode, or if stopping water depth fill-up mode, if the water level sensor (45) is activated, and/or to let the user know how many cups of water the apparatus is on. The sounder (35) is used for ex: if the temperature switch push button central controllers buttons are pressed to signal the Main mcu unit to actuate the water on, the sounder will sound a audio tone or speech from the central controller; if the temperature switch push button central controller's buttons are pressed to signal the Main mcu unit to actuate the water off, the sounder will sound a audio tone or speech from the central controller; if one or more motion sensor(s) are activated, the sounder will sound a audio tone or speech from the central controller for the the entire time period it takes for the apparatus to actuate the water on and automatically actuate the water back off; if setting water depth mode, the sounder (35) will sound a audio tone or speech from the central controller for three seconds; if user is done setting water depth mode, the sounder (35) will sound a audio tone or speech from the controller for six seconds; if sink/tub fill-up mode, once the user press the sink/tub fill up button (25) and the water starts to fill up, the sounder (35) will sound a audio tone or speech from the controller for three seconds; if sink/tub fill-up mode is done, the sounder (35) will sound a audio tone or speech from the controller for six seconds when the water is done filling up; if the water level sensor (45) is activated, the sounder (35) will sound a audio tone or speech from the controller for 2 seconds; if cup-size button is pressed the sounder (35) will sound a audio tone or speech from the controller for a half second to represent a half cup of water and/or audibly say "half cup"; if one cup of water is selected, the sounder (35) will sound a audio tone or speech from the controller for one full second and/or audibly say "one cup" to represent one cup; if one and a half cup of water is selected, the sounder (35) will sound a audio tone or speech from the controller for one full second and/or audibly say "one and a half cup", pause for a quarter of a second then sound a second audio tone or speech again for a half a second to represent one and a half cups; if two cups of water is selected, the sounder will sound a audio tone or speech for one full second and/or audibly say, "two cup", pause for a quarter of a second, hence will sound a audio tone or speech a second time for one second to represent two cups (etc).

CONCLUSION

The Electronic Water Distribution Center Has Been Modified Time After Time in The Last year and a half, and will continue to be modified in due time. There are plenty of Other modifications that will be created for the said apparatus and the modifications made will be pertaining to the apparatus getting smarter and smarter. Also, the said modifications will continue to make sure power consumption drops even less than what it is. I been running this system in my house for one year in a half now strong without any bugs in the system. The Temperature switch push button central controller and the main MCU unit C++ programs does exactly what Its programmed to do and is ready for manufacturing. As stated in the first paragraph of the "DETAILED DESCRIPTION OF VARIOUS EMBODIMENTS", All components utilized in conjunction with the Electronic Water Distribution Center's illustrations in this particular patent are subject to change, and should not be limited to what is depicted, but are utilized to fulfill the policy of this patent. All components whether mechanical (electronic water valves=electronic solenoid valve or electronic motorized proportional valves) or electrical (input signals/button(s), microcontroller(s), radio controller(s), driver(s), motion sensors, water level sensors) will be re-analyzed and different components may or may not be utilized to assemble the Electronic Water Distribution Center. Any and all new components used will have similarities as the stated used components in conjunction with the Electronic Water Distribution Center.

I claim:

1. A system for controlling a supply of water in a network, comprising:
a plurality of local controllers wherein each local controller includes: a transceiver, a first user interface for inputting control signals to control a flow of water, and a first processor wherein the first processor receives user inputs from the first user interface and a sensor input and outputs first signals to control solenoids connected to a local water supply to control the flow of water wherein the user inputs is a command to output a predetermined quantity of water and/or a predetermined temperature of water; and the sensory input causes the first processor to stop the flow of water; and
a central controller for communicating with each of the local controllers, wherein the central controller has a second user interface to receive control signal for controlling the flow of water at each of the local controllers, a second transceiver for communicating with each of the local controllers, a second processor for receiving the control signals from the second user interface wherein the second processor uses the second transceiver to send the control signal to one of the local controllers to control the flow of water at the local controller and wherein the central controller receives input control signals from each of the local controllers.

2. The system for controlling a supply of water in a network in claim 1, further including visual and tactile outputs at each of the local controllers to indicate the status of the local controllers.

3. The system for controlling a supply of water in a network in claim 1, wherein the first and second transceiver communicates via a wire or wirelessly.

4. The system for controlling a supply of water in a network in claim 1, wherein the local controllers are connected to a sink or a tub and the sensory inputs determines the level of water in the sink or the tub.

5. The system for controlling a supply of water in a network in claim 1, wherein the first and second user interface is a motion sensor or a switch.

6. The system for controlling a supply of water in a network in claim 1, wherein the central controller is implanted on a smart phone.

* * * * *